United States Patent [19]

Yamazaki et al.

[11] Patent Number: 4,974,950
[45] Date of Patent: Dec. 4, 1990

[54] OPTICAL SYSTEM FOR DEFLECTING IMAGE

[75] Inventors: Shoichi Yamazaki, Kanagawa; Nozomu Kitagishi, Tokyo, both of Japan

[73] Assignee: Canon Kabushiki Kaishi, Tokyo, Japan

[21] Appl. No.: 363,453

[22] Filed: Jun. 6, 1989

Related U.S. Application Data

[63] Continuation of Ser. No. 116,668, Nov. 4, 1987, abandoned.

[30] Foreign Application Priority Data

Nov. 6, 1986 [JP] Japan .................................. 61-264993
Mar. 18, 1987 [JP] Japan .................................. 62-063041

[51] Int. Cl.$^5$ ............................................. G02B 27/64
[52] U.S. Cl. ..................................... 350/500; 350/475; 356/248
[58] Field of Search ............... 350/475, 476, 481, 500; 356/248

[56] References Cited

U.S. PATENT DOCUMENTS

| | | | |
|---|---|---|---|
| 3,942,862 | 3/1976 | Furukawa et al. | 356/248 |
| 4,522,471 | 6/1985 | Nishioka | 350/475 |
| 4,542,961 | 9/1985 | Sato | 350/475 |
| 4,610,514 | 9/1986 | Nakamura | 350/475 |

Primary Examiner—Bruce Y. Arnold
Assistant Examiner—Martin Lerner
Attorney, Agent, or Firm—Fitzpatrick, Cella, Harper & Scinto

[57] ABSTRACT

An optical system comprising, from front to rear, a first lens group of positive power, a second lens group of negative power and a third lens group of positive power, wherein deflection of an image is made by parallel decentering the second lens group.

28 Claims, 19 Drawing Sheets

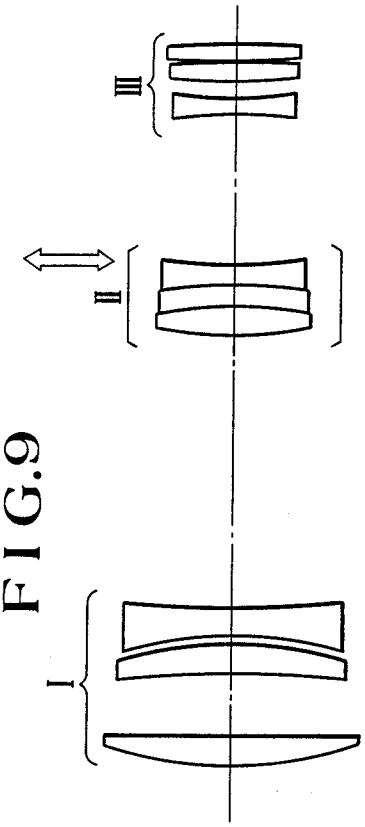
F I G.9
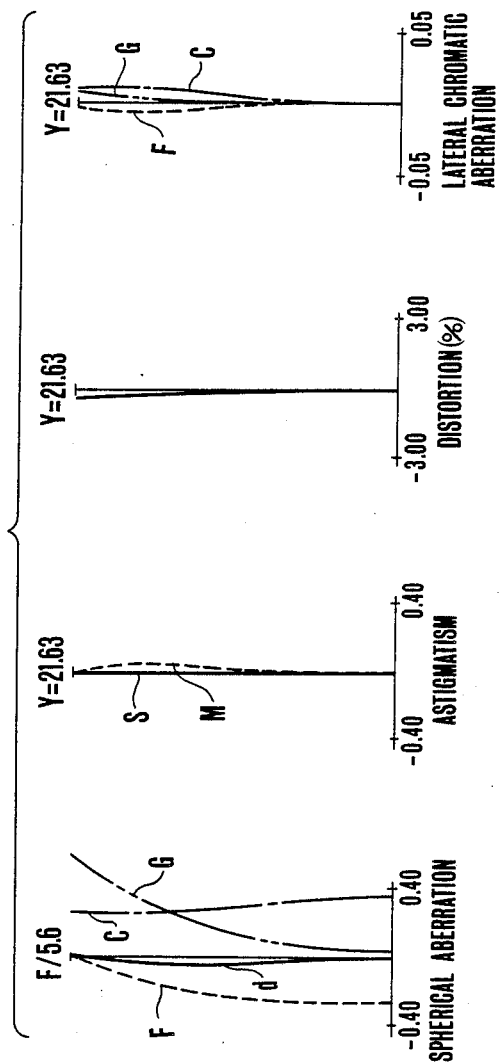
F I G.10(A)

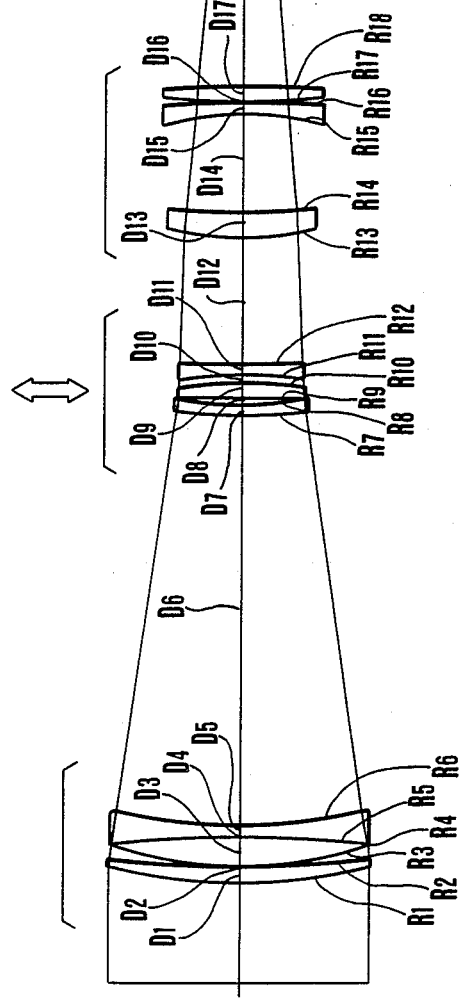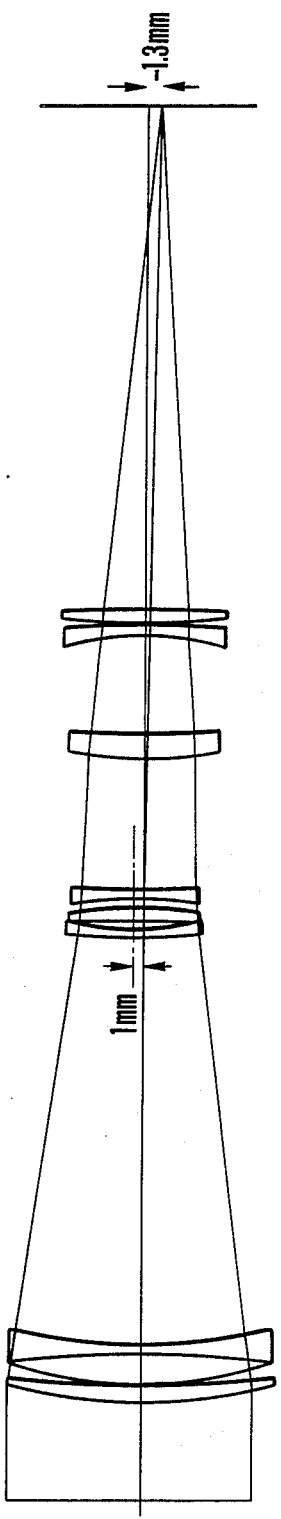

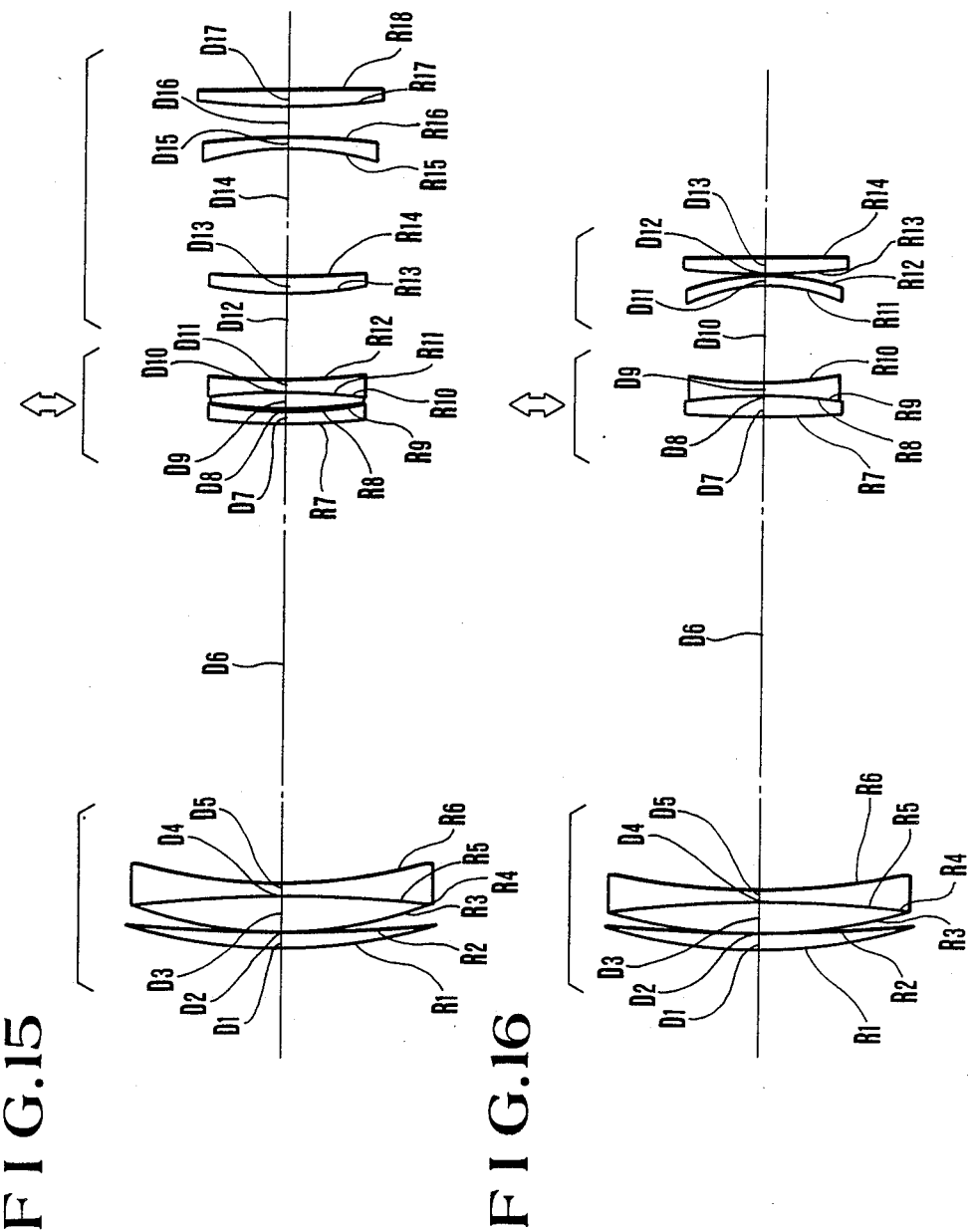

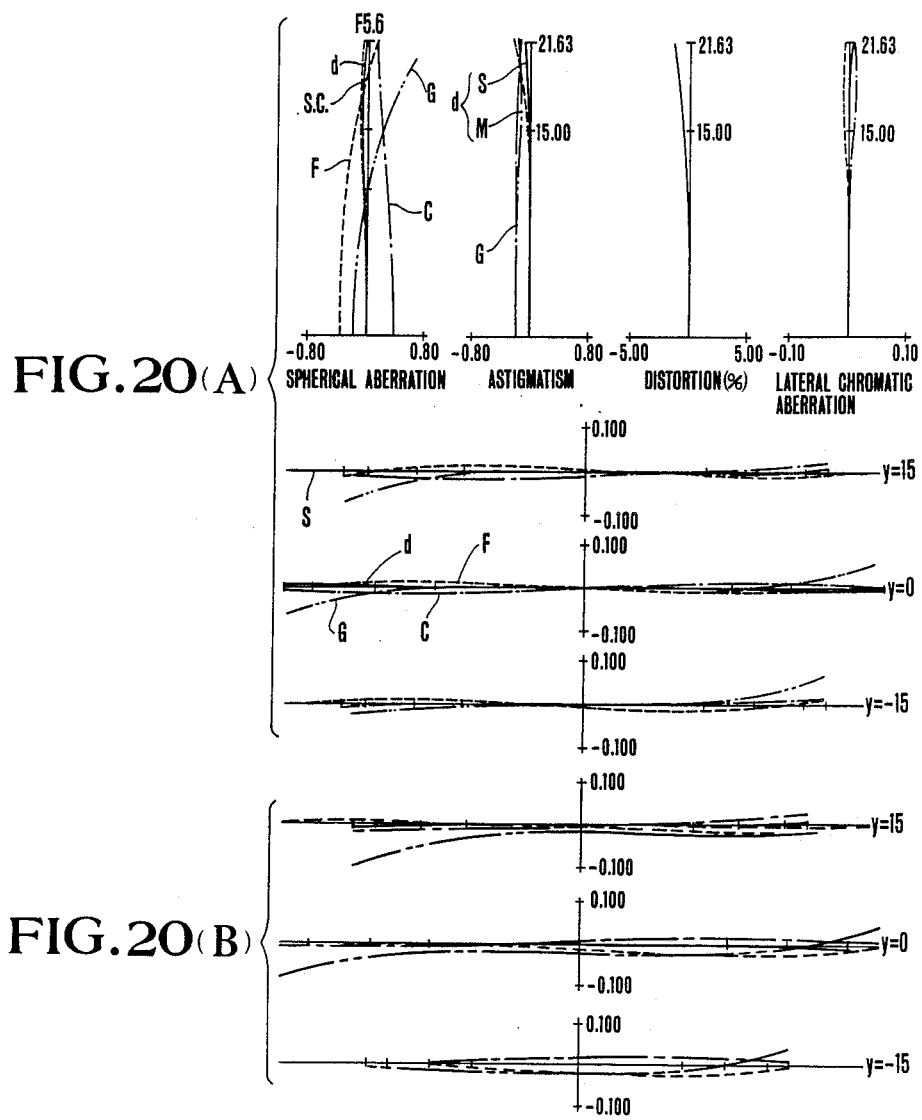

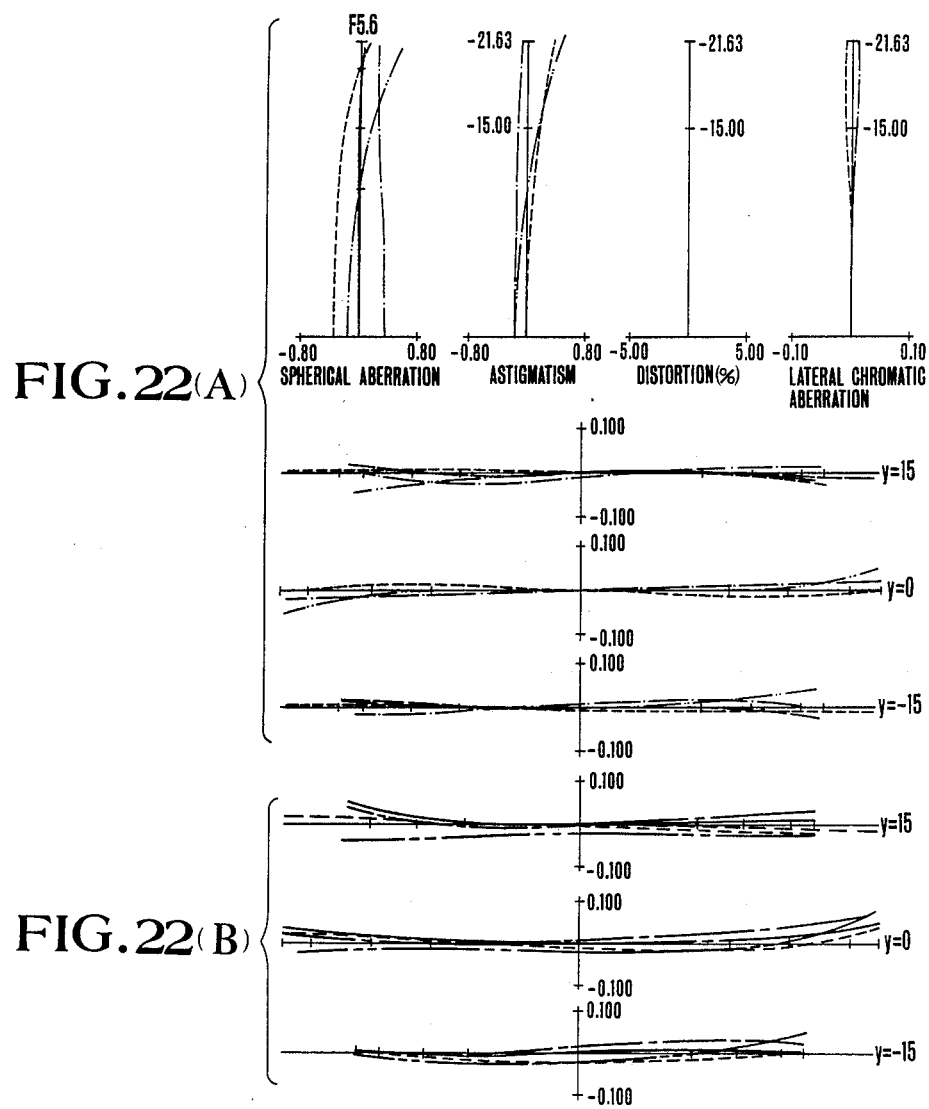

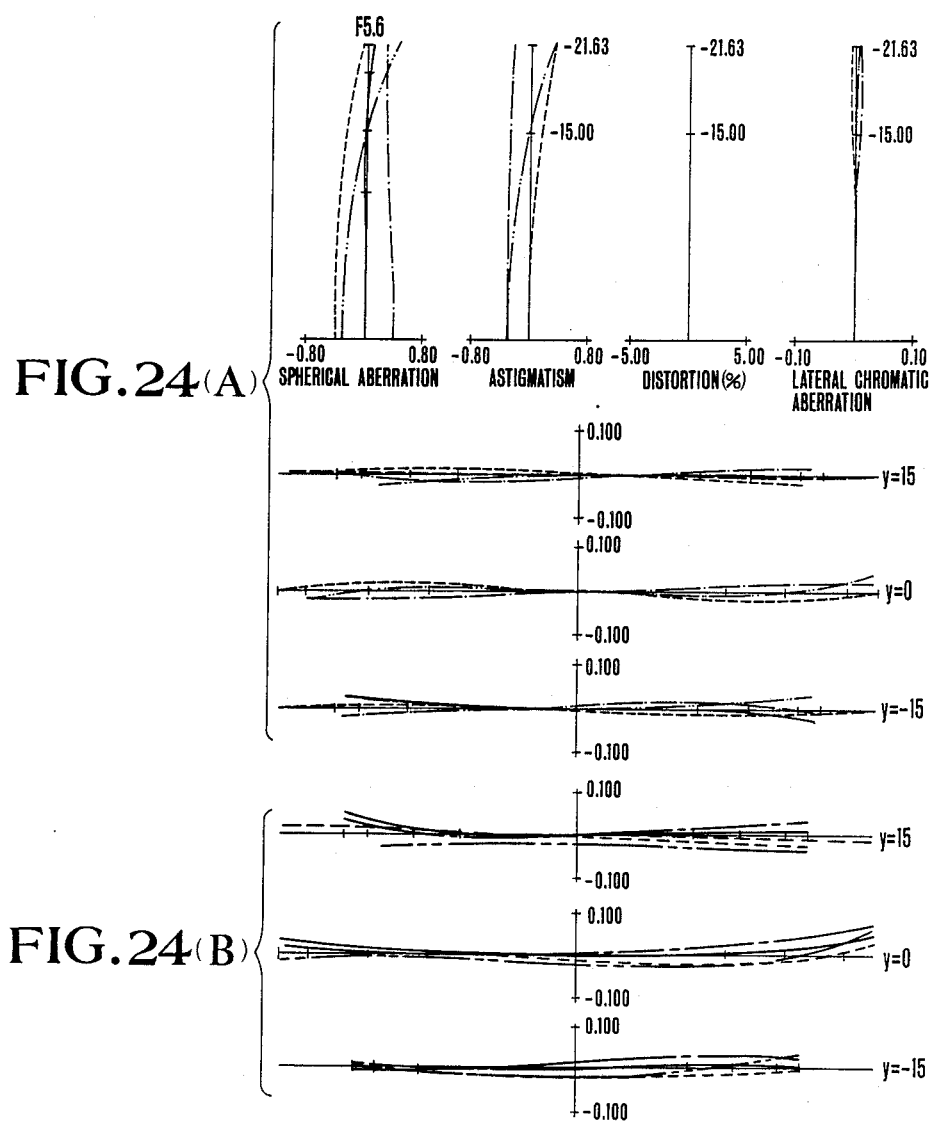

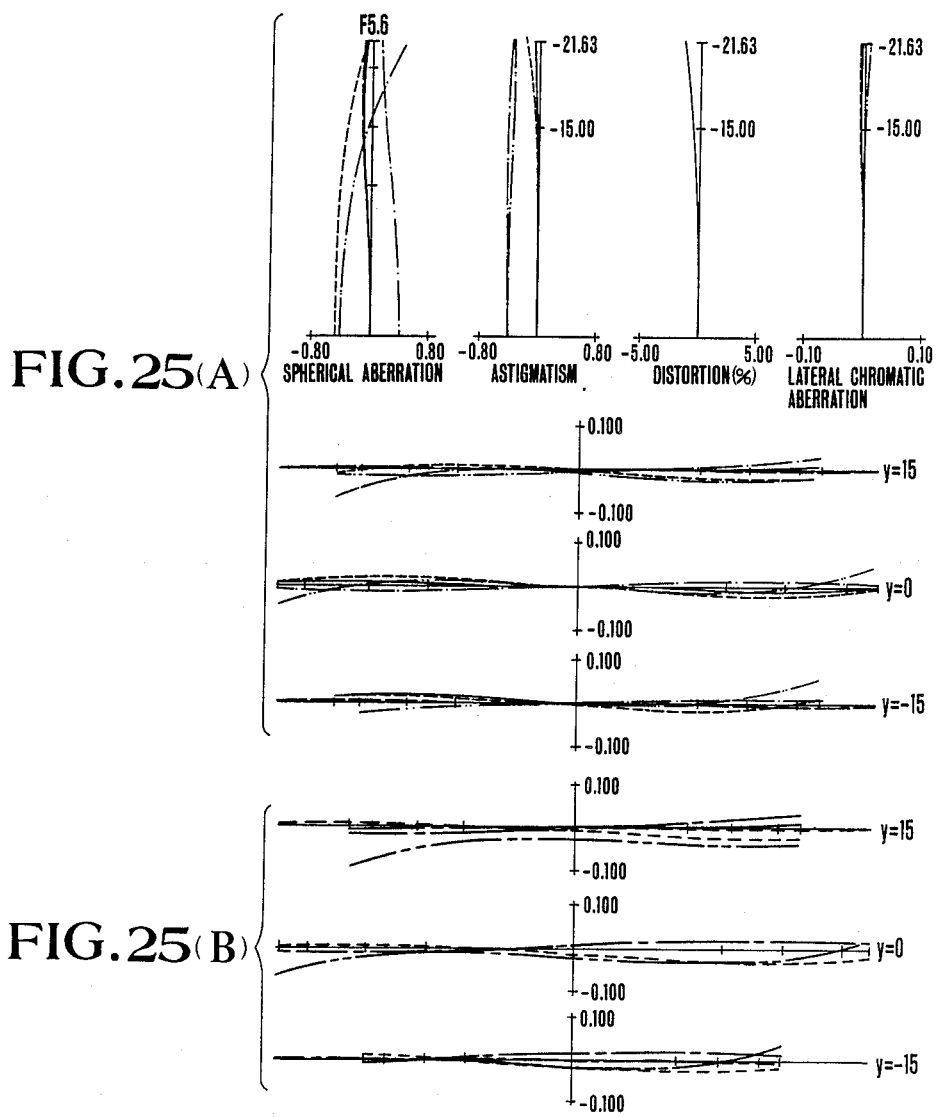

OPTICAL SYSTEM FOR DEFLECTING IMAGE

This application is a continuation-in-part continuation of application Ser. No. 116,668 filed Nov. 4, 1987 now abandoned.

BACKGROUND OF THE INVENTION

1. Field of the Invention

This invention relates to optical systems for deflecting an image and, more particularly, to optical systems in which the image is deflected by decentering a portion of the entire system.

2. Description of the Related Art

When the photographer is shooting picture frames while walking, or riding on a vehicle such as car, aircraft, etc., the photographic lens is vibrated to displace the actual picture frame from the intended line of sight. This displacement increases as the focal length of the photographic lens increases.

There have been previous proposals for stabilizing the optical system against such accidental displacements in, for example, Japanese Patent Publications Nos. Sho 56-34847, 57-7414 and 57-7416.

In these documents, an optical member which constitutes part of the photographic system is arranged to be stationary relative to the line of sight against vibrations. By utilizing a prism this optical member and the other part generate oscillations when the vibration is introduced, and the image at the focal plane is deflected to obtain a stationary image at the focal plane.

Besides this, it is known to employ an acceleration sensor incorporated in the camera for detecting the vibratory motion or the jiggle. Its output is twice integrated to determine the momentum. Depending on the thus-obtained signal, an actuator moves a portion of the photographic system in a direction perpendicular to the optical axis to obtain a stationary image at the focal plane. As the actuator use can be made of, for example, a meter or a laminated assembly of piezoelectric elements arranged to oscillate in two dimensions independently of each other.

In general, the use of the method of oscillating a portion of the photographic system or a lens unit in compensating for the displacement leads to a prerequisite that the responsiveness of the operating mechanism therefore is sufficiently fast.

To this end, it has been required that the size and weight of the movable lens group for displacement compensation be as small as possible, that the inertial mass be reduced, that the relationship of the amount of movement of the compensation lens group with the resultant image shift in the focal plane be simplified, and that the time necessary to compute the required image shift from the angular deviation of the camera from a line of sight be shortened.

In addition thereto, the photographic lens has to be designed so that when decentered by moving the displacement compensator in a direction perpendicular to the optical axis, the optical performance is little lowered.

However, it is usually very difficult to obtain a photographic lens that fulfills all the above-described requirements. Particularly in the case of the displacement compensator having some refractive power, there was a drawback that when decentering took place, the grade of imagery was largely lowered, making it impossible to obtain pictures of good quality.

For note, the method of shifting the image in the focal plane by decentering a constituent lens unit of the lens system is exemplified in U.S. patent application Ser. No. 896,639.

SUMMARY OF THE INVENTION

A first object of the present invention is to provide an optical system for deflecting an image by decentering a lens unit constituting part of the entire system, wherein good correction of decentering aberrations is stabilized over the decentering range.

A second object is to make compact the above-described optical system.

A third object is to minimize the required decentering movement for an equivalent image shift.

Other objects of the invention will become apparent from the following description with reference to the drawings:

BRIEF DESCRIPTION OF THE DRAWINGS

FIGS. 3, 5, 7 and 9 are longitudinal section views of numerical examples 1 to 4 of lenses of the invention.

FIGS. 4(A)-4(C), 6(A)-6(C), 8(A)-8(C) and 10(A)-10(C) are graphic representations of the aberrations of the numerical examples 1 to 4 of the invention respectively. In these graphs, FIGS. 4(A), 6(A), 8(A), 10(A), and 4(B), 6(B), 8(B), 10(B) are respectively the longitudinal and lateral aberrations with an object at infinity, and FIGS. 4(C), 6(C), 8(C), 10(C) are the lateral aberrations with an object at infinity when the second lens group is parallel decentered 1 mm in a direction perpendicular to the optical axis. M and S are the meridional and sagittal image surfaces. Y is the image height.

FIGS. 14(A), 14(B), 15, 16, 17, 18 and 19 are longitudinal section views of other numerical examples 5 to 10 of the invention respectively.

FIGS. 20(A), 20(B); 21(A), 21(B); 22(A), 22(B); 23(A), 23(B); 24(A), 24(B); 25(A), 25(B) are graphic representations of the numerical examples 5 to 10 respectively. In these graphs, 20(A), 21(A), 22(A), 23(A), 24(A), 25(A) are the aberrations before decentering, and 20(B), 21(B), 22(B), 23(B), 24(B), 25(B) are the lateral aberrations when decentered to 1 mm.

DETAILED DESCRIPTION OF THE PREFERRED EMBODIMENTS

Figure 1:
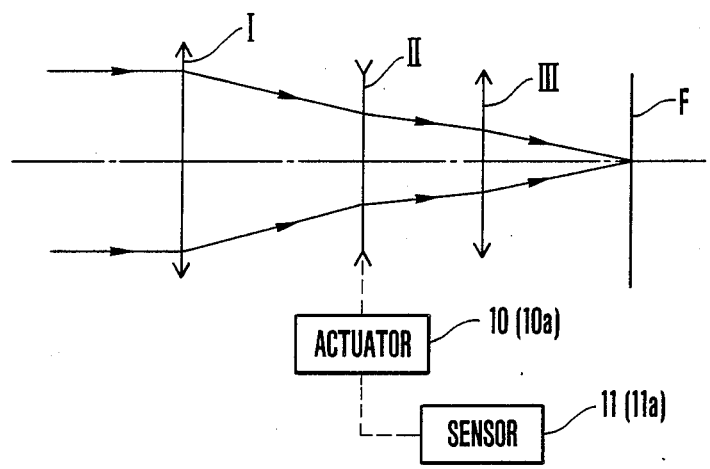
FIGS. 1 and 2 are schematic diagrams of a photographic lens embodying the present invention.

In FIG. 1 there is shown one embodiment of the invention where I is a first lens group of positive power restrained from movement in a direction perpendicular to the optical axis, II is a second lens group consisting of at least one positive lens and at least one negative lens its overall power being negative, and suspended by a support mechanism (not shown) to be movable in a plane perpendicular to the optical axis, and III is a third lens group of positive power restrained from movement in the perpendicular direction to the optical axis. F is a focal plane. 10 is an actuator cooperating with another actuator 10a to move the second lens group II in the perpendicular plane to the optical axis automatically. A vibration detector having two acceleration sensors 11 and 11a or the like determines, for example, the vertical and horizontal components of the vibratory motion of the camera. Based on the output signals of these sensors 11 and 11a which represent a vector combination of them, the actuators 10 and 10a move the second lens unit in such a way that the output signals of the sensors 11, 11a take the prescribed values to compensate for the accidental displacement of the picture frame resulting from the vibration of the camera.

For note, even in the case when the vibration detector 11, 11a is replaced by a light ray deflection detector, the accidental displacement of the picture frame can be compensated for in the exactly the same way.

A particular feature of this embodiment is that the photographic lens is constructed as comprising three lens groups of positive, negative and positive powers in this order from front, and the compensating provision for frame displacement by the parallel decentering is made at the second lens group of negative power. In general, parallel decentering of a portion of the lens system causes production of decentering aberrations in the added form to the original various image aberrations. The decentering aberrations can be assigned mainly to the displacements of coma, astigmatism, field curvature and distortion.

In this embodiment, all these decentering aberrations are well corrected by employing the above-described construction and arrangement of the constituent lens units. Also, by using at least one positive lens and at least one negative lens in the second lens group II to be decentered, the displacement of chromatic aberration resulted from the decentering is well corrected.

Figure 2:
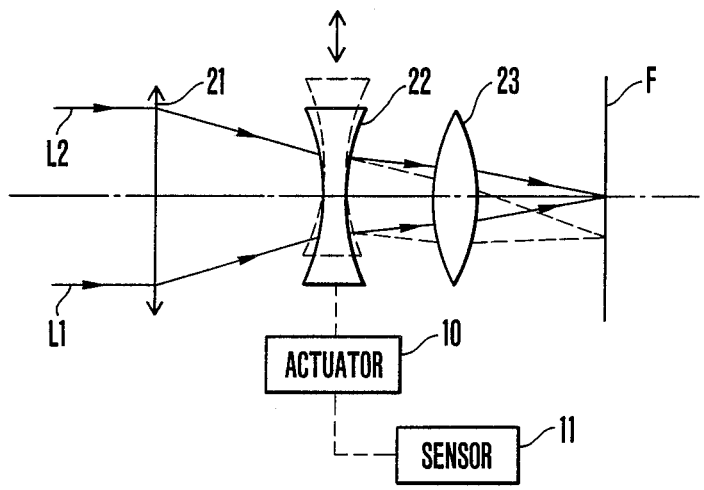
Figure 3:
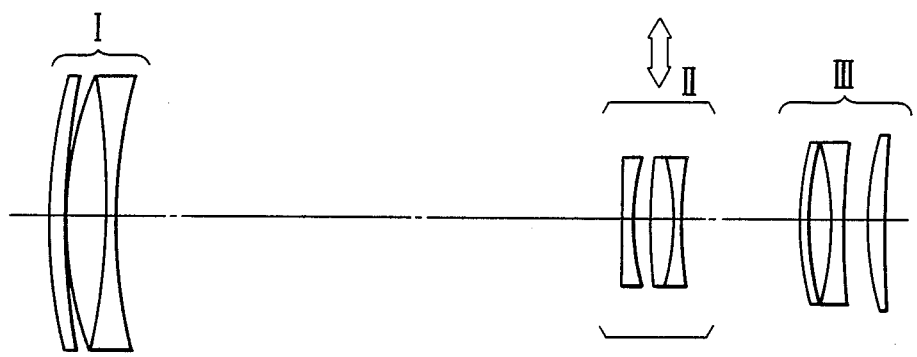
Figure 4A:
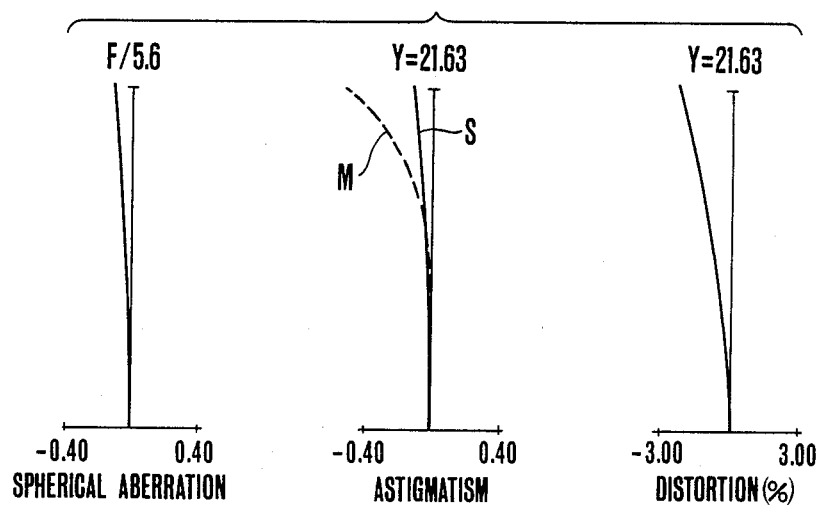
Figure 4B:
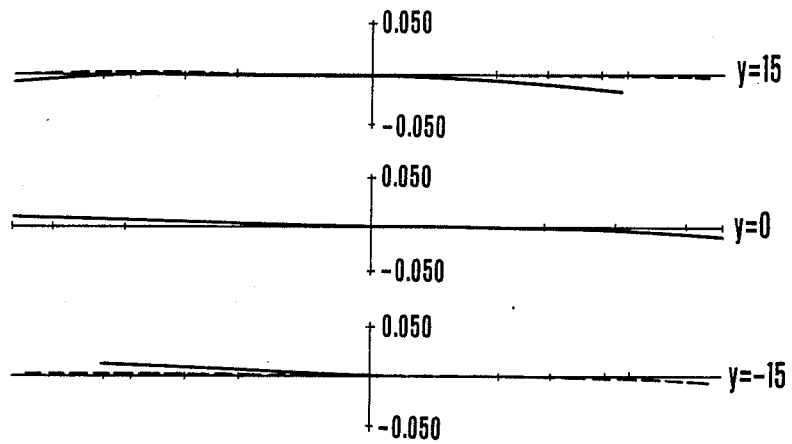
Figure 4C:
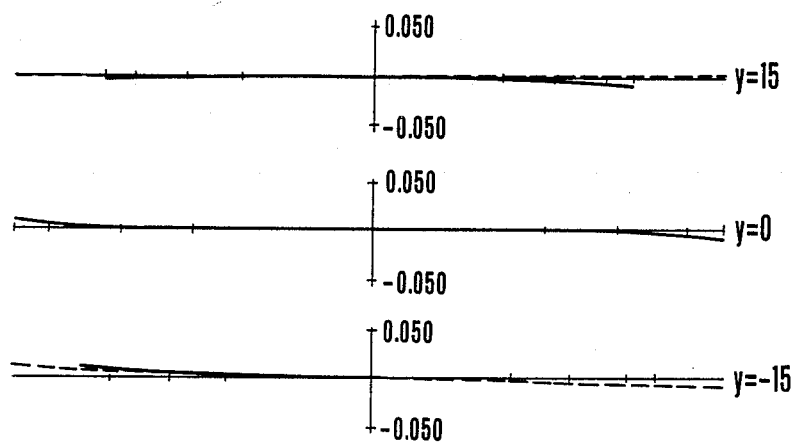
Figure 5:
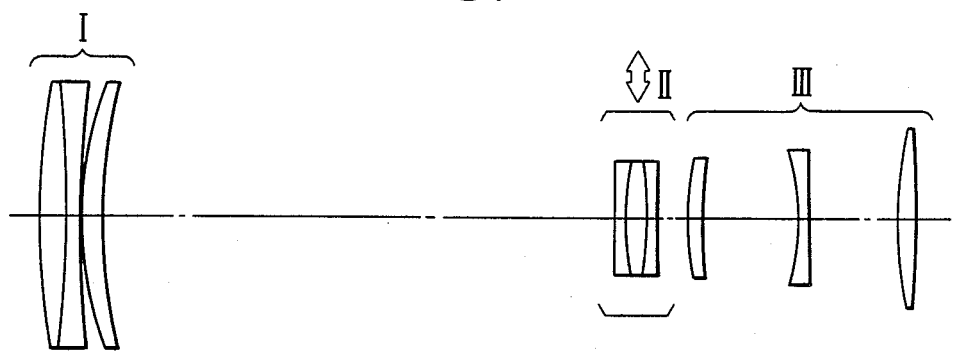
Figure 6A:
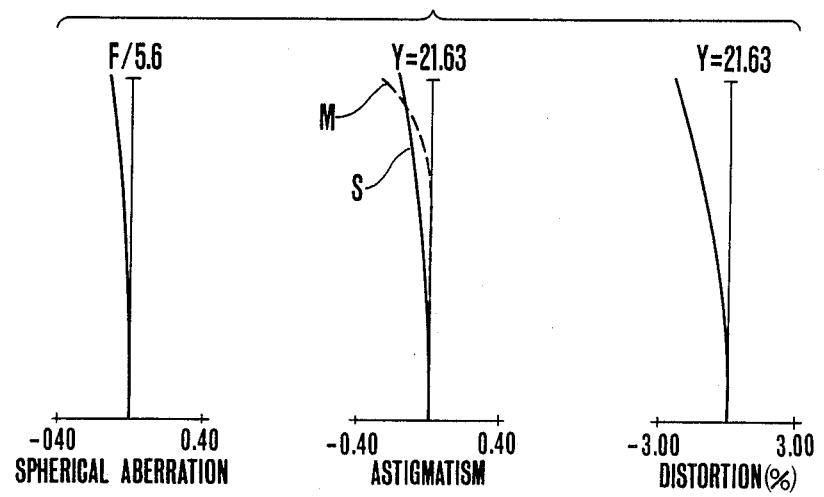
Figure 6B:
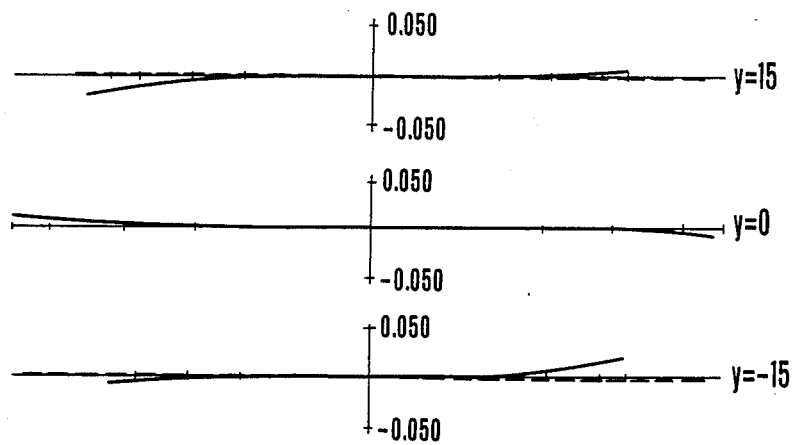
Figure 6C:
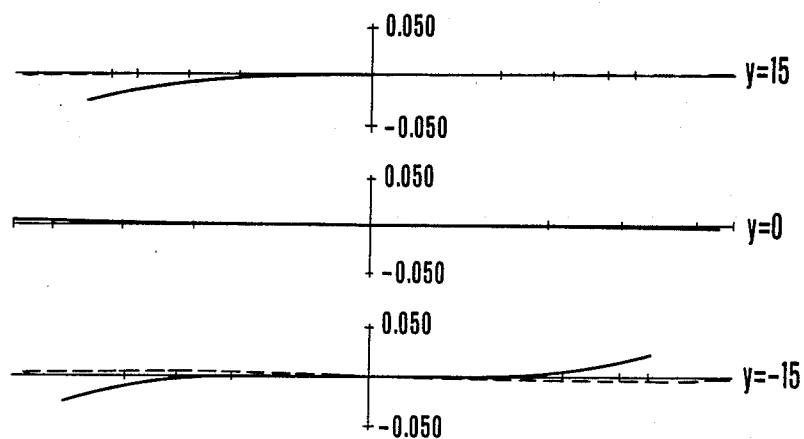
Figure 7:
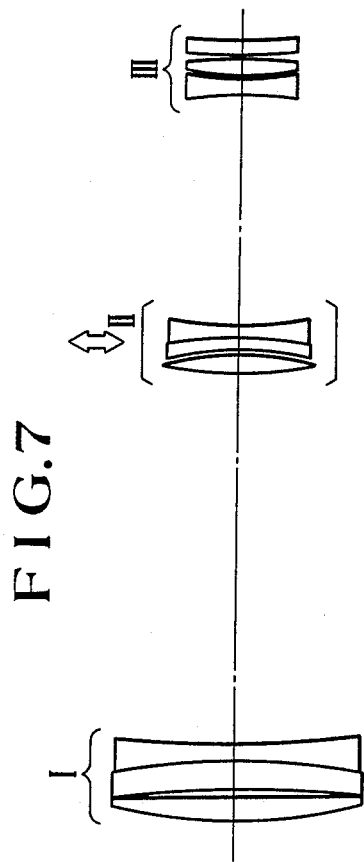
Figure 8A:
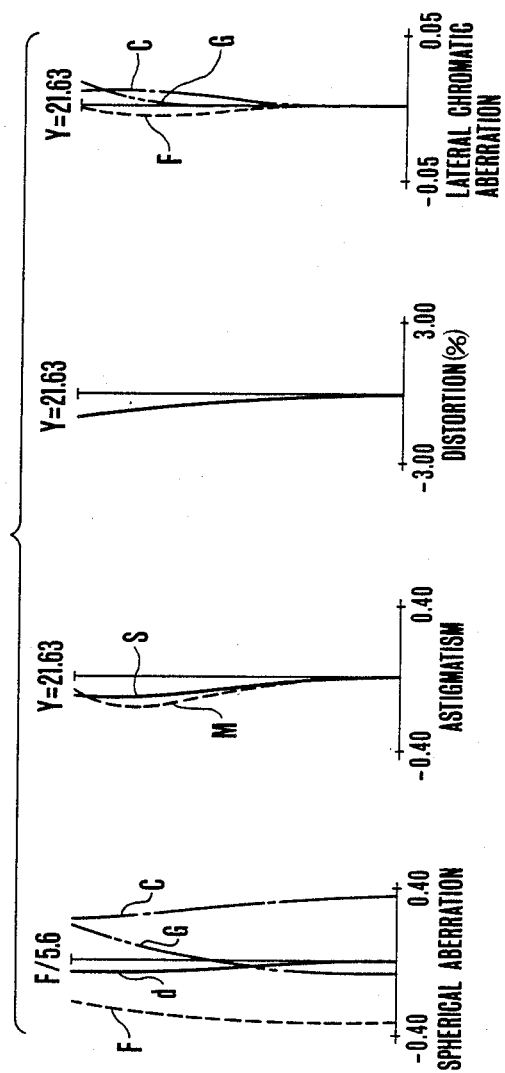
Figure 8B:
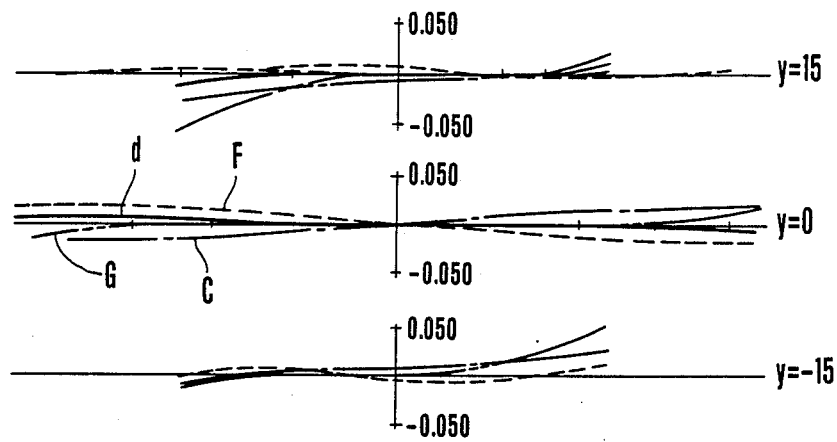
Figure 8C:
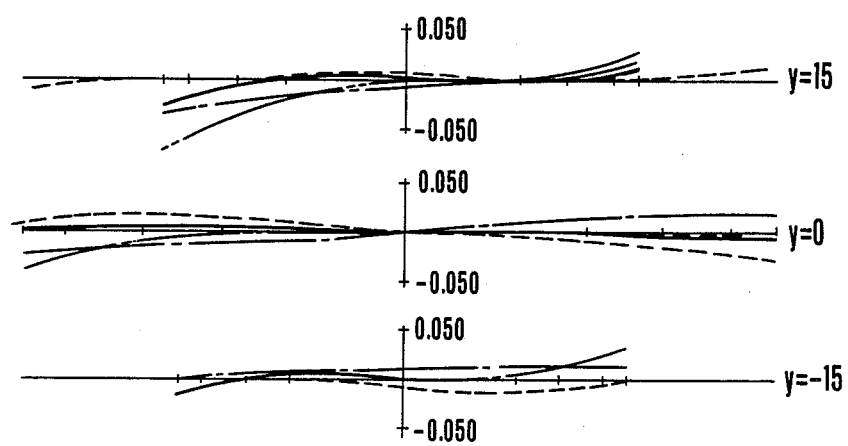
Figure 10B:
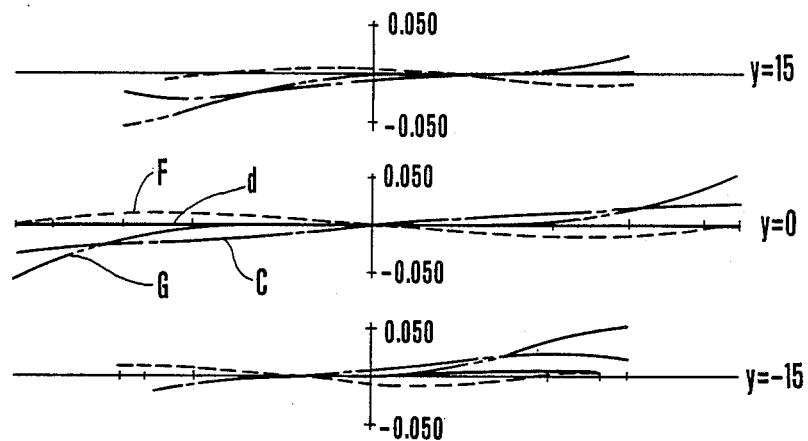
Figure 10C:
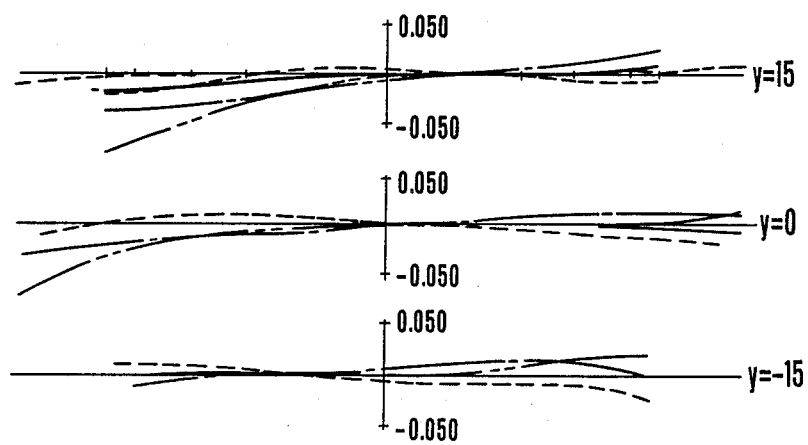

How the features of this embodiment produces the advantage on correction of decentering aberrations is explained by the ray tracing in FIG. 2. For the purpose of simplicity, the second lens group of negative power is shown as one negative lens 22, and the third lens group of positive power as one positive lens 23. Now assuming that the negative lens 22 is parallel decentered as it moves in the perpendicular direction of arrow to the optical axis to a position shown by dashed lines. Then, the lower marginal ray L1 of the axial light beam enters the negative lens 22 at a higher height than before the decentering. For this reason, the negative aberration becomes larger than before the parallel decentering, (as negative decentering aberration is produced). Leaving from the negative lens 22, the lower marginal ray L1 then enters the positive lens 23 also at a higher height than before the negative lens 22 is parallel decentered. For this reason, the positive lens 23 produces larger positive aberrations (positive decentering aberrations). As a result, it becomes possible to make up a good balance in cancellation between the positive and negative decentering aberrations.

In this embodiment, by utilizing such optical properties, the actual physical displacement of the picture frame resulting from the vibratory motion is compensated for in such a manner that the amount of aberration produced by the decentering is minimized.

For the refractive power arrangement in this embodiment, what decentering aberrations are produced when the displacement of the picture frame is compensated for by decentering the movable lens group in the perpendicular direction to the optical axis is explained below from the standpoint of the theory of aberration based on the method Yoshiya Matsui presented to the 23rd Applied Physics Lecture Meeting in 1962 in Japan.

Now, for instance, the decentering curvature of field coefficient (PE) is taken for an example, and the photographic lens is assumed to be a thin lens system. By using the paraxial ray tracing in modifying the original equation, we have $$(PE) = h_{II}\phi_{II}P_{III} - \phi_I P_{II} \quad (1)$$
$$= (h_{II}\phi_{II}\phi_{III})/n_{III} - (\phi_I\phi_{II})/n_{II}$$

where $h_{II}$: the height of incidence from the optical axis of the upper marginal ray on the second lens group capable of parallel decentering;

$\phi_{II}$: the refractive power of the second lens group;

$n_{II}$: the average refractive index of the materials in the second lens group;

$P_{II}$: the Petzval sum of the second lens group;

$\phi_{III}$: the refractive power of the third lens group;

$n_{III}$: the average refractive index of the materials in the third lens group;

$P_{III}$: the Petzval sum of the third lens group; and the focal length of the entire system is normalized to unity.

Since, in the above-defined equation, $h_{II}$, $n_{II}$ and $n_{III}$ are positive, the aberration coefficient (PE) can take 0 only when $\phi_{II}\phi_{III}$ and $\phi_I\phi_{II}$ are of the same sign. For simultaneous occurrence of $\phi_{II}\phi_{III}$ and $\phi_I\phi_{II}$ of the same sine, the refractive powers $\phi_I$, $\phi_{II}$ and $\phi_{III}$ should be either plus-plus-plus or plus-minus-plus in this order from front.

In the former case, however, because not a negative lens group exists in the lens system, even if the aberration coefficient (PE) could be reduced to zero, it would become difficult to correct all aberrations of the entire system in good balance.

In the latter case, on the other hand, as in the embodiment of the invention, it becomes easy to achieve reduction of the aberration coefficient (PE) to zero and good correction of all aberrations of the entire system.

Further, it becomes also possible that the decentering distortional aberration coefficient (VE2) becomes 0 when the second lens group of negative power is parallel decentered.

From the right side of the equation (1), by omitting $h_{II}$, $n_{II}$ and $n_{III}$ because they do not have appreciable contributions to the aberration correction and introducing the responsiveness, 1, (the ratio of the unity of distance the lens unit is parallel decentered to the image shift in the focal plane) it can be rewritten in the form:

$$\phi_{II}\phi_{III}-(\phi_{II}-1)/d \quad (2)$$

where d is the interval between the principal planes of the first and second lens groups.

In the lens system of such a type as in this embodiment of the invention, it is preferred to set forth a range for the factor defined by the formula (2) as follows:

$$|\phi_{II}\phi_{III}-(\phi_{II}-1)/d| \leq 2 \quad (3)$$

When this condition is satisfied, an improved correction of decentering curvature of field, decentering astigmatism and decentering distortion is attained.

If the condition by the inequality (3) is violated to the negative direction, the refractive power of the first lens group becomes too strong, for the spherical aberration and coma are increased. In accompaniment with this, the amount of coma produced by decentering starts to increase.

If that condition is violated to the positive direction, the astigmatism and distortion are intensified. So, the decentering distortion is increased objectionably.

To stabilize the good correction of aberrations against decentering for preserving high grade of optical performance, it is preferred in this embodiment that the second lens group is constructed with three lenses of minus-plus-minus, or plus-minus-plus, or plus-plus-minus in this order from front. Further, the third lens group is constructed also with three lenses of plus-minus-plus, or minus-plus-minus, or minus-plus-plus.

The principle of the invention is applicable not only to the photographic camera and video camera, but also to, for example, the device responsive to motion of an object to be photographed for automatically tracking or following movement of the object by decentering a portion of the lens system, and the auto-framing device determining when to shoot the camera, whereby the framing is changed by decentering a portion of the lens system, and further the auto-tracking device for the objective lens for the CD (compact disc).

Four specific examples of the foregoing embodiment of the invention are given below in the tables of numerical data for the radii of curvature, R, the axial thicknesses or air separations, D, and the refractive indices, N, and Abbe numbers, $\nu$, of the glasses of the lens elements with the subscripts numbered consecutively from front to rear.

These examples 1 to 4 of the specific lenses are illustrated in block form in FIGS. 3, 5, 7 and 9 respectively, and their various aberrations in FIGS. 4(A)–4(C), 6(A)–6(C), 8(A)–8(C) and 10(A)–10(C) respectively. In the block diagrams, I, II and III denote the first, second and third lens groups respectively. The values of the factor in the above-defined inequality of condition (3) for the specific examples are listed in Table-1.

Numerical Example 1
F = 300   FNo = 5.6

| | | |
|---|---|---|
| R1 = 93.92 | D1 = 4.00 | N1 = 1.72000 |
| R2 = 205.05 | D2 = 0.09 | |
| R3 = 95.32 | D3 = 6.00 | N2 = 1.60562 |
| R4 = −194.72 | D4 = 0.09 | |
| R5 = −202.36 | D5 = 3.00 | N3 = 1.72000 |
| R6 = 141.00 | D6 = 96.31 | |
| R7 = 218.37 | D7 = 2.00 | N4 = 1.75500 |
| R8 = 55.82 | D8 = 2.60 | |
| R9 = 131.62 | D9 = 4.00 | N5 = 1.53256 |
| R10 = −90.25 | D10 = 0.09 | |
| R11 = −118.96 | D11 = 2.00 | N6 = 1.75500 |
| R12 = 395.84 | D12 = 21.01 | |
| R13 = 69.01 | D13 = 3.00 | N7 = 1.75700 |
| R14 = 207.19 | D14 = 3.53 | |
| R15 = −52.22 | D15 = 2.00 | N8 = 1.58267 |
| R16 = 603.90 | D16 = 4.88 | |
| R17 = 75.77 | D17 = 3.00 | N9 = 1.75700 |
| R18 = 467.71 | | |

Numerical Example 2
F = 300   FNo = 5.6

| | | |
|---|---|---|
| R1 = 178.73 | D1 = 5.00 | N1 = 1.69680 |
| R2 = −321.53 | D2 = 0.54 | |
| R3 = −219.65 | D3 = 3.00 | N2 = 1.59270 |
| R4 = 300.50 | D4 = 0.12 | |
| R5 = 78.43 | D5 = 4.00 | N3 = 1.69680 |
| R6 = 137.83 | D6 = 101.07 | |
| R7 = 460.33 | D7 = 2.00 | N4 = 1.75500 |
| R8 = 52.52 | D8 = 0.49 | |
| R9 = 64.37 | D9 = 4.00 | N5 = 1.53256 |
| R10 = −136.83 | D10 = 0.09 | |
| R11 = −431.69 | D11 = 2.00 | N6 = 1.75500 |
| R12 = 125.79 | D12 = 6.17 | |
| R13 = 54.81 | D13 = 3.00 | N7 = 1.58900 |

Numerical Example 2 (continued)
F = 300   FNo = 5.6

| | | |
|---|---|---|
| R14 = 178.98 | D14 = 19.23 | |
| R15 = −42.33 | D15 = 2.00 | N8 = 1.66892 |
| R16 = −278.26 | D16 = 17.40 | |
| R17 = 73.90 | D17 = 3.00 | N9 = 1.58900 |
| R18 = −1160.89 | | |

Numerical Example 3
F = 300   FNo = 5.6

| | | | |
|---|---|---|---|
| R1 = 104.54 | D1 = 6.00 | N1 = 1.6700 | $\nu$1 = 57.4 |
| R2 = −1706.00 | D2 = 0.79 | | |
| R3 = −359.39 | D3 = 6.00 | N2 = 1.6700 | $\nu$2 = 57.4 |
| R4 = −141.69 | D4 = 0.0 | | |
| R5 = −141.69 | D5 = 4.00 | N3 = 1.5927 | $\nu$3 = 35.3 |
| R6 = 319.72 | D6 = 93.74 | | |
| R7 = 74.74 | D7 = 4.00 | N4 = 1.5927 | $\nu$4 = 35.3 |
| R8 = −84.04 | D8 = 1.02 | | |
| R9 = −78.63 | D9 = 2.70 | N5 = 1.8830 | $\nu$5 = 40.8 |
| R10 = −117.15 | D10 = 0.03 | | |
| R11 = −230.86 | D11 = 2.70 | N6 = 1.8830 | $\nu$6 = 40.8 |
| R12 = 76.77 | D12 = 47.45 | | |
| R13 = −74.53 | D13 = 2.50 | N7 = 1.5927 | $\nu$7 = 35.3 |
| R14 = 47.74 | D14 = 1.06 | | |
| R15 = 56.19 | D15 = 3.50 | N8 = 1.8830 | $\nu$8 = 40.8 |
| R16 = −207.17 | D16 = 0.09 | | |
| R17 = 85.55 | D17 = 3.00 | N9 = 1.8830 | $\nu$9 = 40.8 |
| R18 = 115.07 | | | |

Numerical Example 4
F = 300   FNo = 5.6

| | | | |
|---|---|---|---|
| R1 = 89.82 | D1 = 6.00 | N1 = 1.6583 | $\nu$1 = 57.3 |
| R2 = ∞ | D2 = 12.79 | | |
| R3 = −305.77 | D3 = 6.00 | N2 = 1.6583 | $\nu$2 = 57.3 |
| R4 = −94.15 | D4 = 1.92 | | |
| R5 = −87.08 | D5 = 6.00 | N3 = 1.5927 | $\nu$3 = 35.3 |
| R6 = 235.76 | D6 = 57.51 | | |
| R7 = 106.21 | D7 = 5.00 | N4 = 1.5927 | $\nu$4 = 35.3 |
| R8 = −136.89 | D8 = 0.10 | | |
| R9 = −348.36 | D9 = 5.00 | N5 = 1.5927 | $\nu$5 = 35.3 |
| R10 = −85.00 | D10 = 0.0 | | |
| R11 = −85.00 | D11 = 3.99 | N6 = 1.8830 | $\nu$6 = 40.8 |
| R12 = 101.40 | D12 = 31.25 | | |
| R13 = −90.31 | D13 = 3.00 | N7 = 1.5927 | $\nu$7 = 35.3 |
| R14 = 62.76 | D14 = 3.33 | | |
| R15 = 86.20 | D15 = 3.99 | N8 = 1.8830 | $\nu$8 = 40.8 |
| R16 = −670.77 | D16 = 0.10 | | |
| R17 = 152.31 | D17 = 3.99 | N9 = 1.8830 | $\nu$9 = 40.8 |
| R18 = −1564.30 | | | |

TABLE 1

| Factor | Numerical Example | | | |
|---|---|---|---|---|
| | 1 | 2 | 3 | 4 |
| $\left\| \phi_{II}\phi_{III} - \dfrac{\phi_{II} - 1}{d} \right\|$ | 0.974 | 0.974 | 0.20 | 0.20 |

As the foregoing embodiment has been described with little consideration on the responsiveness, discussion must now be directed to an optical system which enables the distance the image is shifted in the focal plane to become longer than the decentering distance.

Figure 11:
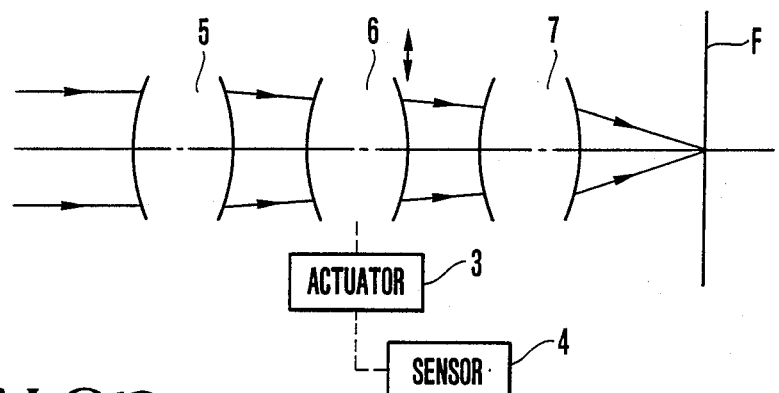
FIGS. 11, 12 and 13 are diagrams of geometry of other embodiments of the invention respectively.
Figure 12:
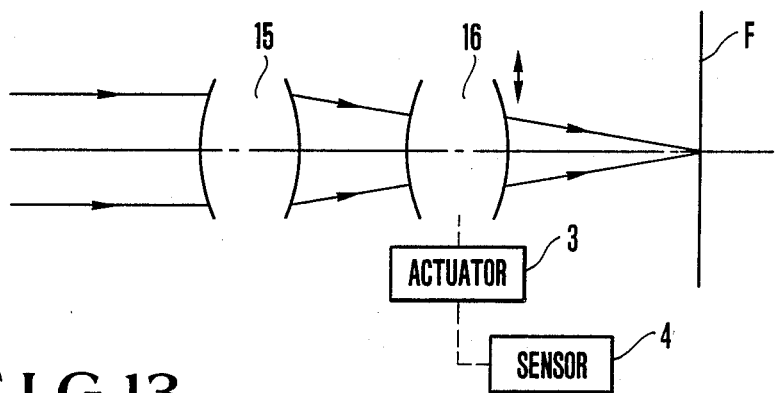
Figure 13:
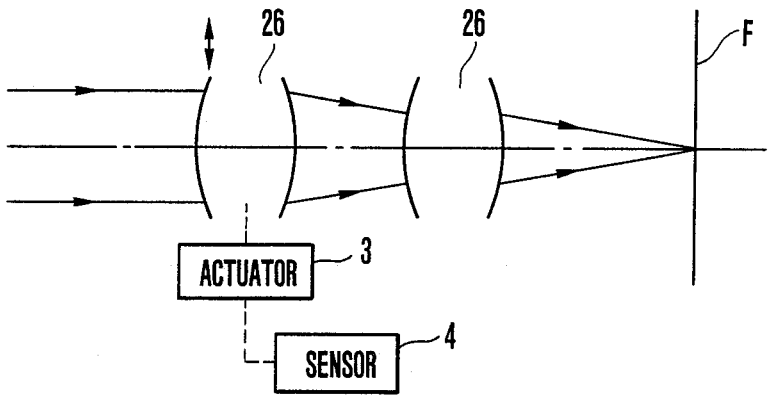
Figure 17:
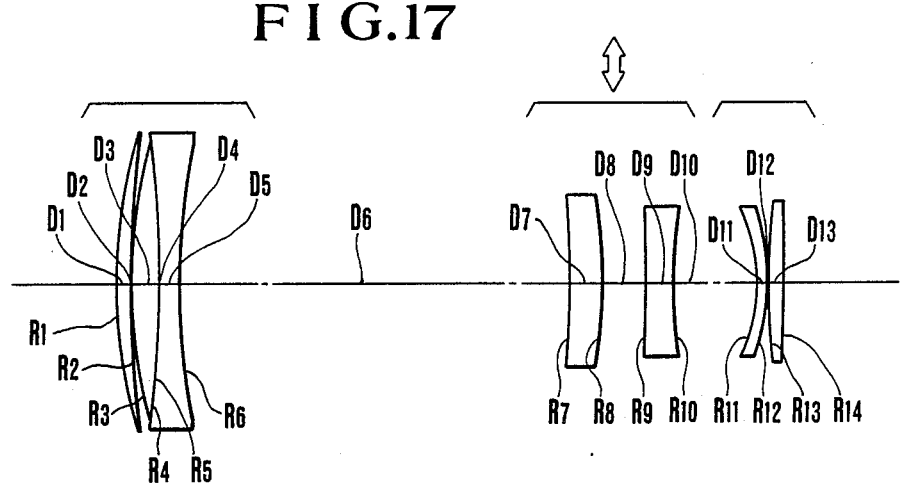
Figure 18:
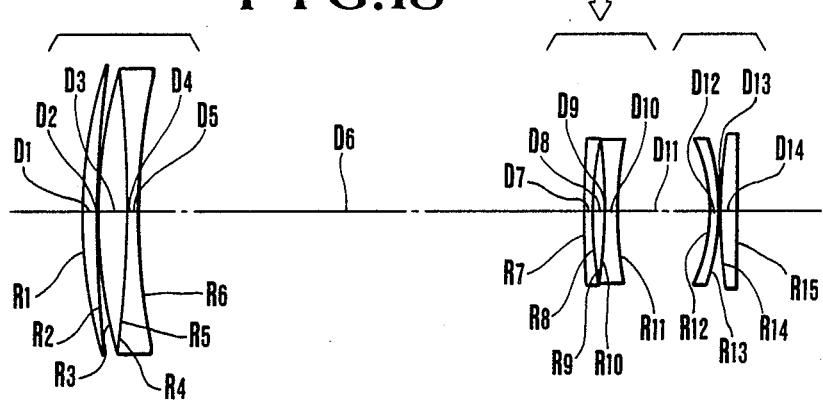
Figure 19:
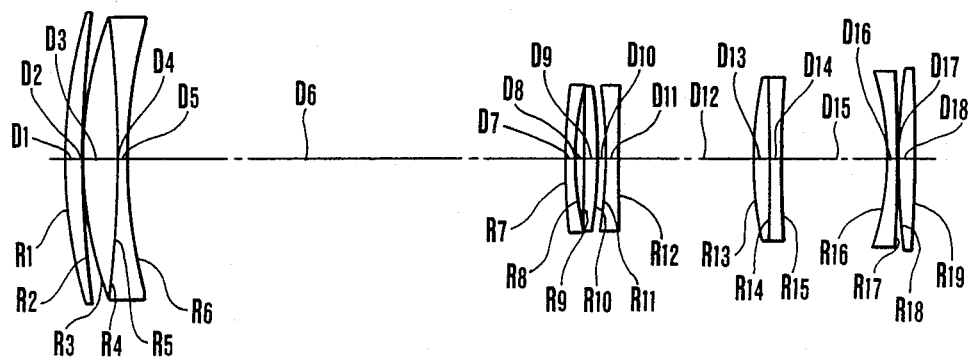
Figures 21A, 21B:
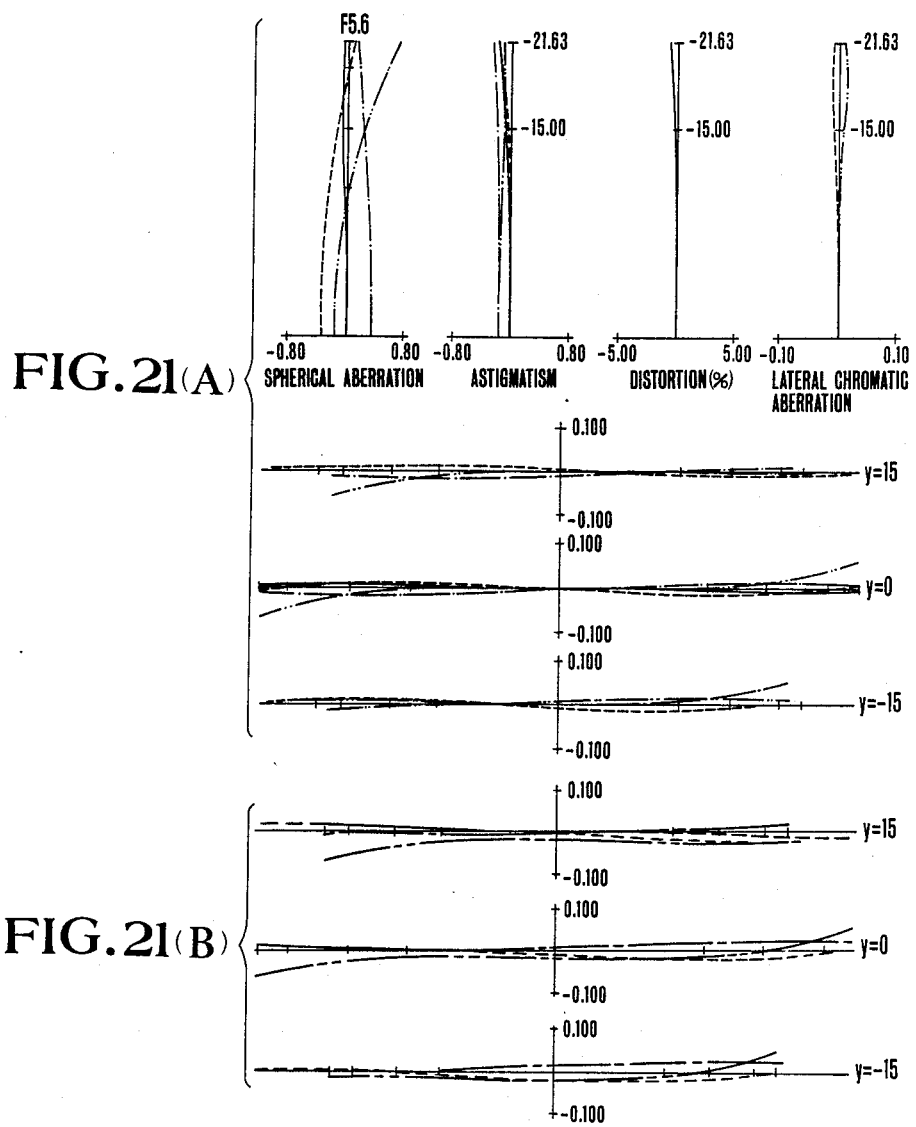
Figures 23A, 23B:
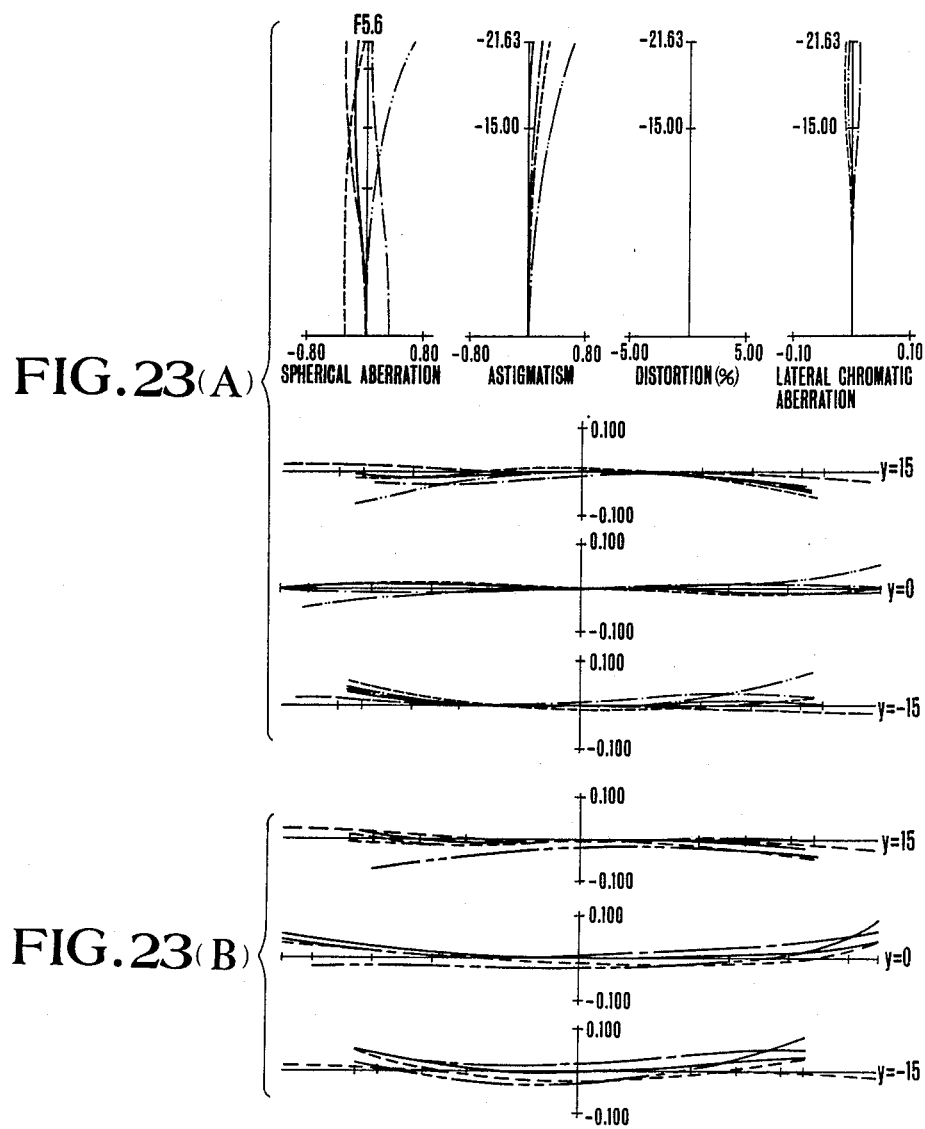

FIGS. 11 to 13 show respectively other embodiments of the invention. In the embodiment of FIG. 11, the image forming lens system comprises, from front to rear, focal first, second and third lens groups 5, 6 and 7, each assumed to consist of a single lens or a plurality of lenses. F is the focal plane. The second lens group 6 is suspended by a support device (not shown) to be freely parallel decentered in a direction perpendicular to the optical axis of the image forming lens system, and is two-dimensionally driven by an actuator 3 such as piezoelectric element. That is, though the actuator 3 is illustrated as to vertically move the second lens group 6, another actuator is provided to move the second lens group 6 in the horizontal plane without mechanical interference with the first one. A vibration detecting sensor 4 such as a velocity meter or gyroscope detects the vertical component of a vibration. Though it is shown also only one in number, there is another vibrating detecting sensor for detecting the horizontal component. The detected values of these components are fed back to the respective actuators 3 so that when the housing of the lens system is displaced in the plane perpendicular to the optical axis, the second lens group 6 is moved to such a direction as to reduce the outputs of the detectors to zero. Thus, the displacement of the picture frame is canceled by the image shift in the focal plane. As the decentering also cause the image plane of sharp focus to shift axially, this is compensated for by an automatic focus detecting mechanism (not shown). Such features are valid also in the cases of the optical arrangements shown in FIGS. 12 and 13.

Here, the degree of responsiveness, l, is defined in terms of the distance, d, the second lens group 6 of FIG. 11 moves in a direction perpendicular to the optical axis and the distance, D, the image is shifted in the focal plane by the movement, d, as D/d. Letting the magnifications of the second and third lens groups 6 and 7 be denoted by $\beta a$ and $\beta b$ respectively, the law of deflection of the light ray gives $$D = \beta b(1-\beta a)d = ld$$

By setting forth a rule of design for $\beta a$ and $\beta b$ as follows:

$$|l| = |\beta b(1-\beta a)| > 1$$

it is made possible to realize a vibration-proof optical system of which the degree of responsiveness is larger than unity.

For another optical system of FIG. 12 constructed with a first lens group 15 and a movable second lens group 16, the magnification $\beta a$ of the second lens group is factored into the degree of responsiveness as follows:

$$D = (1-\beta a)d = ld$$

When the following condition is satisfied, $$|l| = |(1-\beta a)| > 1$$

the degree of responsiveness of the vibration proof optical system becomes greater than unity.

For still another optical system of FIG. 13 of which the first is movable, the equation for the degree of responsiveness in terms of the magnifications $\beta a$ and $\beta b$ of the first and second lens groups 26 and 27 respectively is of the same form as that for the system of FIG. 11. Therefore, when the same condition is satisfied, a vibration-proof optical system having the high speed response characteristic can be realized.

In the type of FIG. 11, when the degree of responsiveness, l, is taken at a value of −1.5, the power arrangement is specified as follows:

| The first lens group (5): | $\psi = 2.0$ |
| The principal point interval: | 0.15 |
| The movable lens group (6): | $\psi = -2.1429$ |
| The principal point interval: | 0.3 |
| The third lens group (7): | $\psi = 0.9091$ |

Though, in the foregoing embodiments, the stabilization of the image has been described in connection with the image forming optical system, the invention is applicable also to the afocal optical systems such as that in the telescope or binocular. Even in this case, the compensation method and the rule of design by the equation for the responsiveness which differs with different arrangement of the lens groups are the same as in the case of the image forming optical system.

In the past, due to the high frequency and large amplitude of the vibrations, the actuator gave rise to a problem of restricting the response speed. In this respect, sufficient compensation for such vibrations was difficult to achieve. This problem would be overcome when the piezoelectric element was used as the actuator, because its response speed is very fast up to $10^{-5}$ sec. But the commonly available piezoelectric element is unable to displace longer than several tens of microns. So, a number of piezoelectric elements may be laminated to expand the displacement to a range of from several hundreds of microns to several millimeters. The invention makes it possible to use this displacement-expansion type of piezoelectric element assembly as the actuator, since the degree of responsiveness of the lens group to be parallel decentered is set to more than unity, for the image is sufficiently stabilized even against high frequencies and large amplitudes of vibrations. Also, because the response speed is increased by the combination of the system of the invention with the piezoelectric actuator, the number of cycles of feedback of the signal from the sensor to the actuator per unit time can be increased with an advantage of achieving a real-time compensation for vibrations. Another advantage is that the structure of the control system becomes simpler than was heretofore possible.

The foregoing has been described in connection with the general case where the degree of responsiveness is greater than unity. Yet, as, in actual practice, the bulk and size of the lens system itself is reduced by strengthening the refractive powers of the second and third lens groups to permit a valuable increase of the image shift, it is preferred to alter the range to $|\beta b(1-\beta a)| \geq 1.2$.

Returning to the before-described optical system, that is, the arrangement of the positive, negative and positive powers in this order from front, discussion must now begin by introducing the degree of responsiveness.

At first, according to Matsui's theory of decentering aberration mentioned before, when a portion of the photographic lens is moved by a distance E to effect parallel decentering, the resultant aberrations $\Delta'Y$ of the entire system can be represented by the sum of the aberrations $\Delta Y$ that occurred before the decentering and the amount of aberration $\Delta Y(E)$ produced by the decentering. That is, expression is given by the following formula.

$$\Delta'Y = \Delta Y + \Delta Y(E)$$

And, the decentering aberration $\Delta Y(E)$ is determined by the equation:

$$\begin{aligned}
\Delta Y(E) = &- (E/2)(\Delta E)\text{(for the shift of the original point)} \\
&- (E/2)(\tan W)^2(3(VE1) - (VE2))\text{(for the} \\
&\quad \text{decentering distortion)} \\
&\pm ER(\tan W)(3(\text{IIIE}) + (PE))\text{(for the decentering} \\
&\quad \text{astigmatism and decentering} \\
&\quad \text{curvature of field)} \\
&- (3E/2)R^2(\text{IIE})\text{(for the decentering coma)}
\end{aligned}$$

where $\Delta E$, IIE, IIIE, PE, VE1 and VE2 are the decentering aberration coefficients.

In other words, for the optical system of the type in which the image is stabilized by decentering, when in decentering, various decentering aberrations such as comatic, astigmatic, field curved and distortional ones are produced.

In order to minimize the amounts of the aforesaid various aberrations produced by the decentering, it is, therefore, in this embodiment of the invention that the first lens group is given a positive power, the second lens group to be decentered a negative power, and the third lens group which is used to correct the aberrations of the decentered second lens group a positive power. Further the second lens group is made up as including at least one positive lens and at least one negative lens with an advantage of well correcting the chromatic aberration resulted from the decentering.

Concerning the design of the second lens group, the following additional conditions are set forth. When these conditions are all or selectively satisfied with the preference in this order, improved results are attained.

$-0.1 > f_{II}/f > -1.65$ (A)

$R_{II1}/f > -0.2, \ 0.1 > R_{II1}/f$ (B)

$|R_{IIa}/R_{IIb}| > 1.8$ (C)

$|f/(f_{II}R_{IIa})| > 0.16$ (D)

$|f/(f_{II}R_{IIb})| > 0.11$ (E)

$|R_{IIc}/f| > 0.05$ (F)

where f is the focal length of the entire system, $f_{II}$ is the focal length of the second lens group, $R_{II1}$ is the radius of curvature of the frontmost lens surface of the second lens group, $R_{IIa}$ and $R_{IIb}$ are the radii of curvature of the one of the air lenses which has the shortest axial thickness if included in the second lens group under the condition that no cemented lens is included, and $R_{IIc}$ is the radius of curvature of the cemented surface of the cemented surface if included in the second lens group.

The inequalities (A) represent a range for the power of the second lens group unit. When the lower limit is exceeded, the focal length $f_{II}$ of the second lens group becomes too large in the negative sense, causing the degree of responsiveness 1 to decrease. When the upper limit is exceeded, the focal length $f_{II}$ becomes too small in the negative sense, increasing the difficulty of correcting aberrations.

The inequalities (B) concern with the frontmost lens surface of the second lens group. For $R_{II1}/f > -0.2$, as the frontmost lens surface has a strong concave curvature, the coma in the normal state is increased with increase in the difficulty of correcting it. Conversely when $R_{II1}/f > 0.1$, the frontmost lens surface becomes a strong convex curvature with the result of over-correction of spherical aberration in the normal state.

The inequality (C) represents a range for the curvature ratio of the air lens of shortest thickness in the second lens group. When the upper limit is exceeded, the curvature of the rear surface $R_{IIb}$ is considerably stronger than that of the front surface, increasing the difficulty of correcting decentering coma and decentering astigmatism.

The factor in the inequalities (D) or (E) represents the relationship between the radius of curvature of the front or rear surface of the thinnest air lens in the second lens group and the focal length of that group. When the upper limit of the inequality (D) is exceeded, the curvature of the front surface $R_{IIa}$ becomes strong and the decentering coma becomes impossible to correct well. When the upper limit of the inequality (E) is exceeded, the curvature of the rear surface $R_{IIb}$ becomes too strong, and correction of the decentering astigmatism becomes more difficult. The inequality (F) represents a range for the radius of curvature of the cemented lens. When the lower limit is exceeded, the curvature becomes too strong, causing higher order decentering aberrations to increase largely.

Next concerning the design of the third lens group, at least one positive lens and at least one negative lens are made included, and the following conditions are satisfied with the preference in this order:

$0.15 < f_{III}/f < 3$ (G)

$0.05 < |f_{AIR}/f| < 1.8$ (H)

$|R_{III1}/R_{IIIk}| < 2.0$ (I)

$0.03 < |R_{IIIN}/f| < 0.6$ (J)

$0.05 > |R_{IIIP}/f| > 0.7$ (K)

$|R_{IIIc}/f| > 0.05$ (L)

where $f_{III}$ is the focal length of the third lens group, $R_{III1}$ and $R_{IIIk}$ are the radii of curvature of the frontmost and rearmost lens surfaces respectively, $R_{IIIN}$ is the shortest of the radii of curvature of the surfaces of the negative lenses in the third lens group, $R_{IIIP}$ is the shortest of the radii of curvature of the surfaces of the positive lenses, $f_{AIR}$ is the focal length of the one of the air lenses which has the shortest axial thickness if included under the condition that no cemented lens is included, and $R_{IIIc}$ is the radius of curvature of the cemented lens if included.

The inequalities (G) represents a range for the power of the third lens group. When the lower limit is exceeded, $f_{III}$ becomes small, or the refractive power becomes strong, causing too much aberrations to produce. When the upper limit is exceeded, the refractive power is too weak and it becomes more difficult for the third lens to cancel the decentering aberrations of the second lens group. The inequalities (H) represents a range for the focal length (refractive power) of the air lens. When the lower limit is exceeded, the focal length of the air lens becomes small, which is reflected to strengthen the curvatures of its surfaces, leaving large residual higher order aberrations in the normal state. Conversely when the upper limit is exceeded, the curvatures are weakened, making it impossible to cancel the decentering coma produced from the second lens group. The inequality (I) represents a range for the ratio of the radii of curvature of the frontmost and rearmost lens surfaces of the third lens group to well correct the astigmatism when in the normal state, and maintain good correction of astigmatism stable against decentering. When the upper limit is exceeded, particularly the decentering aberration is increased remarkably. The inequalities (J) or (K) concern with the surface of strong curvature in either of the group of negative lenses and the group of positive lenses respectively. When the lower limit of each of the inequalities (J) and (K) is exceeded, the curvature becomes too strong to correct higher order aberrations. When the upper limit of the inequalities (J) is exceeded, coma is left uncorrected in the normal state. When the upper limit of the inequalities (K) is exceeded, it becomes impossible to suppress the decentering coma from increasing. The inequality (L) concerns with the radius of curvature of the cemented lens. When the lower limit is exceeded, the curvature becomes strong, causing the decentering lateral chromatic aberration to intensify.

Numerical examples of the invention are shown below. Ri, Di, Ni and vi have the same meanings as those described before. The values of the factors in the conditions (A) to (L) are listed in Table-2.

Numerical Example 5
F = 300  FNo = 1:5.6  2ω = 8.25°

| | | | |
|---|---|---|---|
| R1 = 104.362 | D1 = 3.28 | N1 = 1.72916 | v1 = 54.7 |
| R2 = 237.219 | D2 = 0.06 | | |
| R3 = 81.130 | D3 = 5.86 | N2 = 1.65844 | v2 = 50.9 |
| R4 = −224.294 | D4 = 0.17 | | |
| R5 = −226.267 | D5 = 1.98 | N3 = 1.72047 | v3 = 34.7 |
| R6 = 104.506 | D6 = 81.81 | | |
| R7 = 118.608 | D7 = 1.98 | N4 = 1.75500 | v4 = 52.3 |
| R8 = 59.823 | D8 = 1.34 | | |
| R9 = 634.826 | D9 = 2.99 | N5 = 1.53256 | v5 = 45.9 |
| R10 = −78.033 | D10 = 1.54 | | |
| R11 = −84.901 | D11 = 2.00 | N6 = 1.75500 | v6 = 52.3 |
| R12 = 396.208 | D12 = 25.24 | | |
| R13 = 72.492 | D13 = 4.98 | N7 = 1.75700 | v7 = 47.8 |
| R14 = 192.068 | D14 = 20.09 | | |
| R15 = −48.235 | D15 = 1.99 | N8 = 1.58267 | v8 = 46.4 |
| R16 = −201.397 | D16 = 0.09 | | |
| R17 = 135.187 | D17 = 2.99 | N9 = 1.75700 | v9 = 47.8 |
| R18 = −390.113 | | | |

Numerical Example 6
F = 300  FNo = 1:5.6  2ω = 8.25°

| | | | |
|---|---|---|---|
| R1 = 99.479 | D1 = 3.00 | N1 = 1.72916 | v1 = 54.7 |
| R2 = 284.343 | D2 = 0.09 | | |
| R3 = 80.594 | D3 = 5.73 | N2 = 1.65844 | v2 = 50.9 |
| R4 = −261.667 | D4 = 0.55 | | |
| R5 = −256.555 | D5 = 2.00 | N3 = 1.72047 | v3 = 34.7 |
| R6 = 91.048 | D6 = 81.43 | | |
| R7 = 153.938 | D7 = 1.99 | N4 = 1.75500 | v4 = 52.3 |
| R8 = 59.318 | D8 = 0.70 | | |
| R9 = 105.719 | D9 = 3.00 | N5 = 1.53256 | v5 = 45.9 |
| R10 = −74.627 | D10 = 0.03 | | |
| R11 = −88.767 | D11 = 2.00 | N6 = 1.75500 | v6 = 52.3 |
| R12 = 145.415 | D12 = 15.74 | | |
| R13 = 77.361 | D13 = 3.00 | N7 = 1.75700 | v7 = 47.8 |
| R14 = 192.183 | D14 = 22.49 | | |
| R15 = −48.198 | D15 = 2.00 | N8 = 1.58267 | v8 = 46.4 |
| R16 = −104.443 | D16 = 5.34 | | |
| R17 = 124.607 | D17 = 3.00 | N9 = 1.75700 | v9 = 47.8 |
| R18 = 1998.296 | | | |

Numerical Example 7
F = 300  FNo = 1:5.6  2ω = 8.25°

| | | | |
|---|---|---|---|
| R1 = 95.018 | D1 = 2.94 | N1 = 1.72916 | v1 = 54.7 |
| R2 = 241.595 | D2 = 0.03 | | |
| R3 = 98.919 | D3 = 5.39 | N2 = 1.65844 | v2 = 50.9 |
| R4 = −185.588 | D4 = 0.00 | | |
| R5 = −191.570 | D5 = 1.93 | N3 = 1.72047 | v3 = 34.7 |
| R6 = 117.945 | D6 = 83.85 | | |
| R7 = 222.203 | D7 = 3.55 | N4 = 1.53256 | v4 = 45.9 |
| R8 = −94.513 | D8 = 0.33 | | |
| R9 = −119.348 | D9 = 2.00 | N5 = 1.75500 | v5 = 52.3 |
| R10 = 67.571 | D10 = 17.50 | | |
| R11 = −31.384 | D11 = 1.78 | N6 = 1.58267 | v6 = 46.4 |
| R12 = −37.475 | D12 = 0.01 | | |
| R13 = 115.875 | D13 = 3.01 | N7 = 1.75700 | v7 = 47.8 |
| R14 = −591.888 | | | |

Numerical Example 8
F = 300  FNo = 1:5.6  2ω = 8.25

| | | | |
|---|---|---|---|
| R1 = 102.861 | D1 = 2.90 | N1 = 1.72916 | v1 = 54.7 |
| R2 = 276.100 | D2 = −0.10 | | |
| R3 = 103.821 | D3 = 5.19 | N2 = 1.65844 | v2 = 50.9 |
| R4 = −181.826 | D4 = −0.40 | | |
| R5 = −192.021 | D5 = 3.93 | N3 = 1.72047 | v3 = 34.7 |
| R6 = 128.051 | D6 = 72.86 | | |
| R7 = −200.000 | D7 = 6.07 | N4 = 1.53256 | v4 = 45.9 |
| R8 = −114.640 | D8 = 8.36 | | |
| R9 = −291.075 | D9 = 5.05 | N5 = 1.75500 | v5 = 52.3 |
| R10 = 85.495 | D10 = 15.92 | | |
| R11 = −30.811 | D11 = 2.09 | N6 = 1.58267 | v6 = 46.4 |
| R12 = −35.666 | D12 = −0.00 | | |
| R13 = 133.880 | D13 = 2.97 | N7 = 1.75700 | v7 = 47.8 |
| R14 = −469.320 | | | |

Numerical Example 9
F = 300  FNo = 1:5.6  2ω = 8.25°

| | | | |
|---|---|---|---|
| R1 = 95.018 | D1 = 2.94 | N1 = 1.72916 | v1 = 54.7 |
| R2 = 241.595 | D2 = 0.03 | | |
| R3 = 98.919 | D3 = 5.39 | N2 = 1.65844 | v2 = 50.9 |
| R4 = −185.588 | D4 = 0.00 | | |
| R5 = −191.570 | D5 = 1.93 | N3 = 1.72047 | v3 = 34.7 |
| R6 = 117.945 | D6 = 83.85 | | |
| R7 = 222.203 | D7 = 1.55 | N4 = 1.53172 | v4 = 48.9 |
| R8 = 90.000 | D8 = 2.00 | N5 = 1.53256 | v5 = 45.9 |
| R9 = −94.513 | D9 = 0.33 | | |
| R10 = −119.241 | D10 = 2.00 | N6 = 1.75500 | v6 = 52.3 |
| R11 = 67.571 | D11 = 17.50 | | |
| R12 = −31.384 | D12 = 1.78 | N7 = 1.58267 | v7 = 46.4 |
| R13 = −37.475 | D13 = 0.01 | | |
| R14 = 115.875 | D14 = 3.01 | N8 = 1.75700 | v8 = 47.8 |
| R15 = −591.888 | | | |

Numerical Example 10
F = 300  FNo = 1:5.6  2ω = 8.25°

| | | | |
|---|---|---|---|
| R1 = 104.362 | D1 = 3.28 | N1 = 1.72916 | v1 = 54.7 |
| R2 = 237.219 | D2 = 0.06 | | |
| R3 = 81.130 | D3 = 5.86 | N2 = 1.65844 | v2 = 50.9 |
| R4 = −224.294 | D4 = 0.17 | | |
| R5 = −226.267 | D5 = 1.98 | N3 = 1.72047 | v3 = 34.7 |
| R6 = 104.506 | D6 = 81.81 | | |
| R7 = 118.608 | D7 = 1.98 | N4 = 1.75500 | v4 = 52.3 |
| R8 = 59.823 | D8 = 1.34 | | |
| R9 = 634.826 | D9 = 2.99 | N5 = 1.53256 | v5 = 45.9 |
| R10 = −78.033 | D10 = 1.54 | | |
| R11 = −84.901 | D11 = 2.00 | N6 = 1.75500 | v6 = 52.3 |
| R12 = 396.208 | D12 = 25.32 | | |
| R13 = 72.492 | D13 = 3.00 | N7 = 1.75700 | v7 = 47.8 |
| R14 = −500.000 | D14 = 1.98 | N8 = 1.75500 | v8 = 52.3 |
| R15 = 192.068 | D15 = 20.09 | | |
| R16 = −48.235 | D16 = 1.99 | N9 = 1.58267 | v9 = 46.4 |
| R17 = −201.397 | D17 = 0.09 | | |

-continued

Numerical Example 10
F = 300  FNo = 1:5.6  2ω = 8.25°

R18 = 135.600   D18 = 2.99   N10 = 1.75700   ν10 = 47.8
R19 = −390.113

TABLE 2

| Factor | Numerical Example | | | | | |
|---|---|---|---|---|---|---|
| | 5 | 6 | 7 | 8 | 9 | 10 |
| $f_{II}/f$ | −0.36 | −0.36 | −0.36 | −0.36 | −0.36 | −0.36 |
| $\|R_{IIa}/R_{IIb}\|$ | 0.6 | 0.8 | 0.8 | 0.4 | — | 0.6 |
| $R_{II1}/f$ | 0.51 | 0.51 | 0.74 | −0.67 | 0.74 | 0.51 |
| $\|f/(f_{II} \cdot R_{IIa})\|$ | 0.047 | 0.037 | 0.029 | 0.025 | — | 0.047 |
| $\|f/(f_{II} \cdot R_{IIb})\|$ | 0.026 | 0.031 | 0.024 | 0.01 | — | 0.026 |
| $R_{IIc}/f$ | — | — | — | — | 0.3 | — |
| $f_{III}/f$ | 0.63 | 0.63 | 0.63 | 0.63 | 0.63 | 0.04 |
| $\|f_{AIR}/f\|$ | 0.39 | 0.29 | 0.15 | 0.15 | 0.15 | — |
| $\|R_{III1}/R_{IIIK}\|$ | 0.04 | 0.04 | 0.05 | 0.07 | 0.05 | 0.04 |
| $\|R_{IIIN}/f\|$ | 0.16 | 0.16 | 0.10 | 0.10 | 0.10 | 0.16 |
| $\|R_{IIIP}/f\|$ | 0.27 | 0.27 | 0.39 | 0.45 | 0.39 | 0.24 |
| $\|R_{IIIc}/f\|$ | — | — | — | — | — | 1.67 |

As has been described above, according to the present invention, an optical system well corrected for decentering aberrations can be provided, and the image can be advantageously stabilized.

What is claimed is:

1. An optical system for deflecting an image, comprising:
   from front to rear,
   a first lens group having a positive refractive power;
   a second lens group having a negative refractive power; and
   a third lens group having a positive refractive power;
   wherein the image is deflected by decentering said second lens group and the system satisfies the following condition:

$$|\phi_{II}\phi_{III} - (\phi_{II}-1)d| \leqq 2$$

where $\phi_{II}$ and $\phi_{III}$ are the refractive powers of said second and said third lens groups respectively, d is the interval between the principal points of said first and said second lens groups, and l is the distance the image is shifted in a prescribed focal plane when said second lens group moves unit distance in a direction substantially perpendicular to an optical axis to effect parallel decentering, wherein the refractive power of the entire system is normalized to unity.

2. An optical system for deflecting an image, comprising:
   from front to rear,
   a first lens group having a positive refractive power;
   a second lens group having a negative refractive power; and
   a third lens group having a positive refractive power;
   wherein the image is deflected by decentering said second lens group and the system satisfies the following condition:

$$|\beta b(1-\beta a)| \geqq 1.2$$

where $\beta a$ and $\beta b$ are the magnifications of said second and said third lens groups respectively.

3. An optical system for deflecting an image, comprising:
   from front to rear,
   a first lens group having a positive refractive power;
   a second lens group having a negative refractive power; and
   a third lens group having a positive refractive power;
   wherein the image is deflected by decentering said second lens group and the system satisfies the following condition:

$$-1.65 < f_{II}/f < -0.1$$

where $f_{II}$ is the focal length of said second lens group, and f is the focal length of the entire system.

4. An optical system according to claim 3, satisfying the following conditions:

$$R_{II1}/f > -0.2,\ 0.1 < R_{II1}/f$$

where $R_{II1}$ is the radius of curvature of the frontmost lens surface of said second lens group.

5. An optical system according to claim 4, wherein said second lens group does not include any cemented lens but includes an air lens of the shortest axial separation, and satisfying the following conditions:

$$|R_{IIa}/R_{IIb}| < 1.8$$

$$|f/(f_{II} R_{IIa})| < 0.16$$

$$|f/(f_{II} R_{IIb})| < 0.11$$

where $R_{IIa}$ and $R_{IIb}$ are the radii of curvature of front and rear surfaces of said air lens.

6. An optical system according to claim 4, wherein said second lens group includes a cemented lens of a positive lens and a negative lens, and satisfying the following conditions:

$$|R_{IIc}/f| < 0.05$$

where $R_{IIc}$ is the radius of curvature of the cemented surface of said cemented lens.

7. An optical system comprising:
   from front to rear,
   a first lens group having a positive refractive power:
   a second lens group having a negative refractive power; and
   a third lens group having a positive refractive power;
   wherein the image is deflected by decentering said second lens group; and
   wherein said third lens group includes at least one positive lens and at least one negative lens, and satisfying the following conditions:

$$0.15 < f_{III}/f < 3$$

wherein $f_{III}$ is the focal length of said third lens group, and f is the focal length of the entire system.

8. An optical system according to claim 7 wherein said third lens group does not include any cemented lens, but includes an air lens of the shortest axial separation, and satisfying the following conditions:

$$0.05 < |f_{AIR}/f| < 1.8$$

$$|R_{III1}/R_{IIIK}| < 2.0$$

where $f_{AIR}$ is the focal length of said air lens, and $R_{III1}$ and $R_{IIIK}$ are the radii of curvature of the frontmost and rearmost surfaces of said third lens group respectively.

9. An optical system according to claim 7, wherein said third lens group includes a cemented lens, and satisfying the following conditions:

$$0.03 < |R_{IIIN}/f| < 0.6$$

$$0.05 < |R_{IIIP}/f| < 0.7$$

$$0.05 < |R_{IIIc}/f|$$

where $R_{IIIN}$ is the shortest of the radii of curvature of the surfaces of the negative lenses included in said third lens group, $R_{IIIP}$ is the longest of the radii of curvature of the surfaces of the positive lenses, and $R_{IIIc}$ is the radius of curvature of the cemented surface of said cemented lens.

10. A photographic optical system for stabilizing an image, comprising:
   a lens group movable for decentering from an optical axis of said photographic optical system to stabilize the image;
   a rear lens group positioned on the image side of said movable lens group, said system satisfying the following condition:

$$|\beta b(1-\beta a)| > 1$$

where $\beta a$ and $\beta b$ are the lateral magnifications of said movable and said rear lens groups respectively.

11. An optical system according to claim 10, satisfying the following condition:

$$|\beta b(1-\beta a)| \geq 1.2.$$

12. An optical system according to claim, 10, further comprising a front lens group positioned on the object side of said movable lens group and having a positive refractive power.

13. An optical system according to claim 12, satisfying the following condition:

$$-1.65 < f_{II}/f < -0.1$$

where $f_{II}$ is the focal length of said movable lens group, and f is the focal length of the entire system.

14. An optical system according to claim 11 or 12, wherein said rear lens group includes at least one positive lens and at least negative lens, and satisfying the following condition:

$$0.15 < f_{III}/f < 3$$

where $f_{III}$ is the focal length of said rear lens group and f is the focal length of the entire system.

15. An optical system according to claim 13, wherein said movable lens does not include any cemented lens, but includes an air lens of the shortest axial separation, and satisfying the following conditions:

$$|R_{IIa}/R_{IIb}| < 1.8$$

$$R_{II1}/f < -0.2, \ 0.1 < R_{II1}/f$$

where $R_{IIa}$ and $R_{IIb}$ are the radii of curvature of the front and rear surfaces of said air lens, and $R_{II1}$ is the radii of curvature of the frontmost lens surface of said movable lens group.

16. An optical system for deflecting an image, comprising:
   from front to rear;
   a first lens group composed of a plurality of lenses and having as a whole a positive refractive power;
   a second lens group composed of a plurality of lenses and having as a whole a negative refractive power, the lens space between said first and second lens groups being the longest in the whole system;
   a third lens group composed of a plurality of lenses and having as a whole a positive refractive power;
   a sensor unit for sensing deflection of said optical system; and
   a driving unit for decentering said second lens unit on the basis of an output of said sensor unit.

17. An optical system according to claim 16, satisfying the following condition:

$$|\phi_{II} \phi_{III} - (\phi_{II} - 1)/d| \leq 2$$

where $\phi_{II}$ and $\phi_{III}$ are the refractive powers of said second and said third lens groups respectively, d is the interval between the principal points of said first and said second lens groups, and I is the distance the image is shifted in a prescribed focal plane when said second lens group moves unit distance in a direction substantially perpendicular to an optical axis to effect parallel decentering, wherein the refractive power of the entire system is normalized to unity.

18. An optical system according to claim 16, satisfying the following condition:

$$|\beta b(1-\beta a)| \geq 1.2$$

where $\beta a$ and $\beta b$ are the magnifications of said second and said third lens groups respectively.

19. An optical system according to claim 16, satisfying the following condition:

$$-1.65 < f_{II}/f < -0.1$$

where $f_{II}$ is the focal length of said second lens group, and f is the focal length of the entire system.

20. An optical system according to claim 19, satisfying the following conditions:

$$R_{III}/f < -0.2, \ 0.1 < R_{III}/f$$

where $R_{III}$ is the radius of curvature of the frontmost lens surface of said second lens group.

21. An optical system according to claim 20, wherein said second lens group does not include any cemented lens but includes an air lens of the shortest axial separation, and satisfying the following conditions:

$$|R_{IIa}/R_{IIb}| < 1.8$$

$$|f/(f_{II} R_{IIa})| < 0.16$$

$$|f/(f_{II} R_{IIb})| < 0.11$$

where $R_{IIa}$ and $R_{IIb}$ are the radii of curvature of front and rear surfaces of said air lens.

22. An optical system according to claim 20, wherein said second lens group includes a cemented lens of a positive lens and a negative lens, and satisfying the following conditions:

$$|R_{IIc}/f| > 0.05$$

wherein $R_{IIc}$ is the radius of curvature of the cemented surface of said cemented lens.

23. An optical system according to claim 16, wherein said third lens group includes at least one positive lens and at least one negative lens, and satisfying the following condition:

$$0.15 < f_{III}/f < 3$$

where $f_{III}$ is the focal length of said third lens group, and f is the focal length of the entire system.

24. An optical system according to claim 23, wherein said third lens group does not include any cemented lens, but includes an air lens of the shortest axial separation, and satisfying the following conditions:

$$0.05 < |f_{AIR}/f| < 1.8$$

$$|R_{III1}/R_{IIIK}| < 2.0$$

where $f_{AIR}$ is the focal length of said air lens, and $R_{III1}$ and $R_{IIIK}$ are the radii of curvature of the frontmost and rearmost surfaces of said third lens group respectively.

25. A photographic optical system for stabilizing an image, comprising:
   a front lens group, and a rear lens group that is located behind said front lens group and is arranged to be decentered from the optical axis of the photographic optical system by a decentering means so as to stabilize an image formed by the rear lens group, while satisfying the condition:

$$|(1-\beta a)| > 1$$

wherein $\beta a$ is the magnification of said rear lens group.

26. A photographic optical system according to claim 25, wherein said decentering means further comprises sensor means for sensing vibratory motion or jiggle and means, connected to said sensor means, for decentering said rear lens group on the basis of the output of said sensor means to stabilize the image.

27. An optical system for deflecting an image, comprising:
   a front lens group having a positive refractive power,
   an intermediate lens group having a negative refractive power and,
   a rear lens group having a positive refractive power;
   wherein said intermediate lens group is decentered, so as to deflect the image, while the optical system satisfies the condition:

$$-1.65 < f_{II}/f < -0.1$$

wherein f is the focal length of the entire optical system and $f_{II}$ is the focal length of the intermediate lens group.

28. An optical system according to claim 27, satisfying the condition:

$$0.15 < f_{III}/f < 3$$

wherein $f_{III}$ is the focal length of the rear lens group.

* * * * *

UNITED STATES PATENT AND TRADEMARK OFFICE
CERTIFICATE OF CORRECTION

PATENT NO. : 4,974,950

DATED : December 4, 1990

INVENTOR(S) : SHOICHI YAMAZAKI, ET AL.

It is certified that error appears in the above-identified patent and that said Letters Patent is hereby corrected as shown below:

Column 1:

Line 4, "continuation-in-part" should be deleted.

Column 2:

Line 2, "lens unit" should read --lens group--.

Line 55, "lens" should read --lens,--.

Column 3:

Line 29, "produces" should read --produce--.

UNITED STATES PATENT AND TRADEMARK OFFICE
CERTIFICATE OF CORRECTION

PATENT NO. : 4,974,950
DATED : December 4, 1990
INVENTOR(S) : SHOICHI YAMAZAKI, ET AL.

It is certified that error appears in the above-identified patent and that said Letters Patent is hereby corrected as shown below:

Column 7:

Line 21, "cause" should read --causes--.

Column 9:

Line 37, $R_{II1}/f > -0.2, 0.1 > R_{II1}/f$  (B)" should read
--$R_{II1}/f < -0.2, 0.1 < R_{II1}/f$  (B)--.

Line 38, "$|R_{IIa}/R_{IIb}| > 1.8$  (C)" should read
-- $R_{IIa}/R_{IIb} < 1.8$  (C)--.

Line 40, "$|f/(f_{II}R_{IIa})| > 0.16$  (D)" should read
-- $f/(f_{II}R_{IIa}) < 0.16$  (D)--.

Line 42, "$|f/(f_{II}R_{IIb})| > 0.11$  (E)" should read
-- $f/(f_{II}R_{IIb}) < 0.11$  (E)--.

UNITED STATES PATENT AND TRADEMARK OFFICE
CERTIFICATE OF CORRECTION

PATENT NO. : 4,974,950
DATED : December 4, 1990
INVENTOR(S) : SHOICHI YAMAZAKI ET AL Page 3 of 5

It is certified that error appears in the above-identified patent and that said Letters Patent is hereby corrected as shown below:

Column 9:

Line 64, "$R_{II1}/f > -0.2,$" should read --$R_{II1}/f \geq 0.2,$--.

Line 68, "$R_{II1}/f > 0.1,$" should read --$R_{II1}/f < 0.1,$--.

Column 10:

Line 37, "$0.05 > |R_{IIIP}/f| > 0.7$ (K)" should read --$0.005 < R_{IIIP}/f < 0.7$ (K)--.

Line 42, Italics should be deleted.

Line 43, Italics should be deleted.

Line 51, "represents" should read --represent--.

Line 54, "aberrations to produce." should read --aberration to be produced.--

Line 58, "represents" should read --represent--.

UNITED STATES PATENT AND TRADEMARK OFFICE
CERTIFICATE OF CORRECTION

PATENT NO. : 4,974,950

DATED : December 4, 1990

INVENTOR(S) : SHOICHI YAMAZAKI, ET AL

It is certified that error appears in the above-identified patent and that said Letters Patent is hereby corrected as shown below:

Column 14:

Line 17, "$R_{III}$" should read --$R_{III}$--.

Line 41, "optical system comprising:" should read

--optical system for deflecting an image comprising:--.

UNITED STATES PATENT AND TRADEMARK OFFICE
CERTIFICATE OF CORRECTION

PATENT NO. : 4,974,950
DATED : December 4, 1990
INVENTOR(S) : SHOICHI YAMAZAKI, ET AL.

It is certified that error appears in the above-identified patent and that said Letters Patent is hereby corrected as shown below:

Column 15:

Line 11, Italics should be deleted.

Line 12, Italics should be deleted.

Line 46, "negative lens" should read --one negative lens--.

Line 64, "radii" should read --radius--.

Column 16:

Line 11, "second lens unit" should read --second lens group--.

Signed and Sealed this

First Day of September, 1992

Attest:

DOUGLAS B. COMER

Attesting Officer     Acting Commissioner of Patents and Trademarks

UNITED STATES PATENT AND TRADEMARK OFFICE
CERTIFICATE OF CORRECTION

PATENT NO. : 4,974,950
DATED : December 4, 1990
INVENTOR(S) : SHOICHI YAMAZAKI, ET AL.

It is certified that error appears in the above-identified patent and that said Letters Patent is hereby corrected as shown below:

COLUMN 13

Line 39, "$|\phi_{II}\phi_{III} - (\phi_{II}-1)d| \leq 2$" should read -- $|\phi_{II}\phi_{III} - (\phi_{II}-\ell)/d| \leq 2$ --.

COLUMN 14

Line 15, "$R_{III}/f > -0.2, 0.1 < R_{III}/f$" should read -- $R_{III}/f < -0.2, 0.1 < R_{III}/f$ --.

Line 17, "$R_{III}$" should read -- $R_{III}$ --.

Line 37, "$|R_{IIc}/f| < 0.05$" should read -- $|R_{IIc}/f| > 0.05$ --.

Signed and Sealed this

Twenty-fourth Day of August, 1993

Attest:

BRUCE LEHMAN

Attesting Officer

Commissioner of Patents and Trademarks